July 27, 1965   L. C. WILLIAMS ETAL   3,197,353
APPARATUS FOR MOUNTING FILMS AND OTHER INSERTS IN CARDS
Original Filed March 28, 1957   10 Sheets-Sheet 1
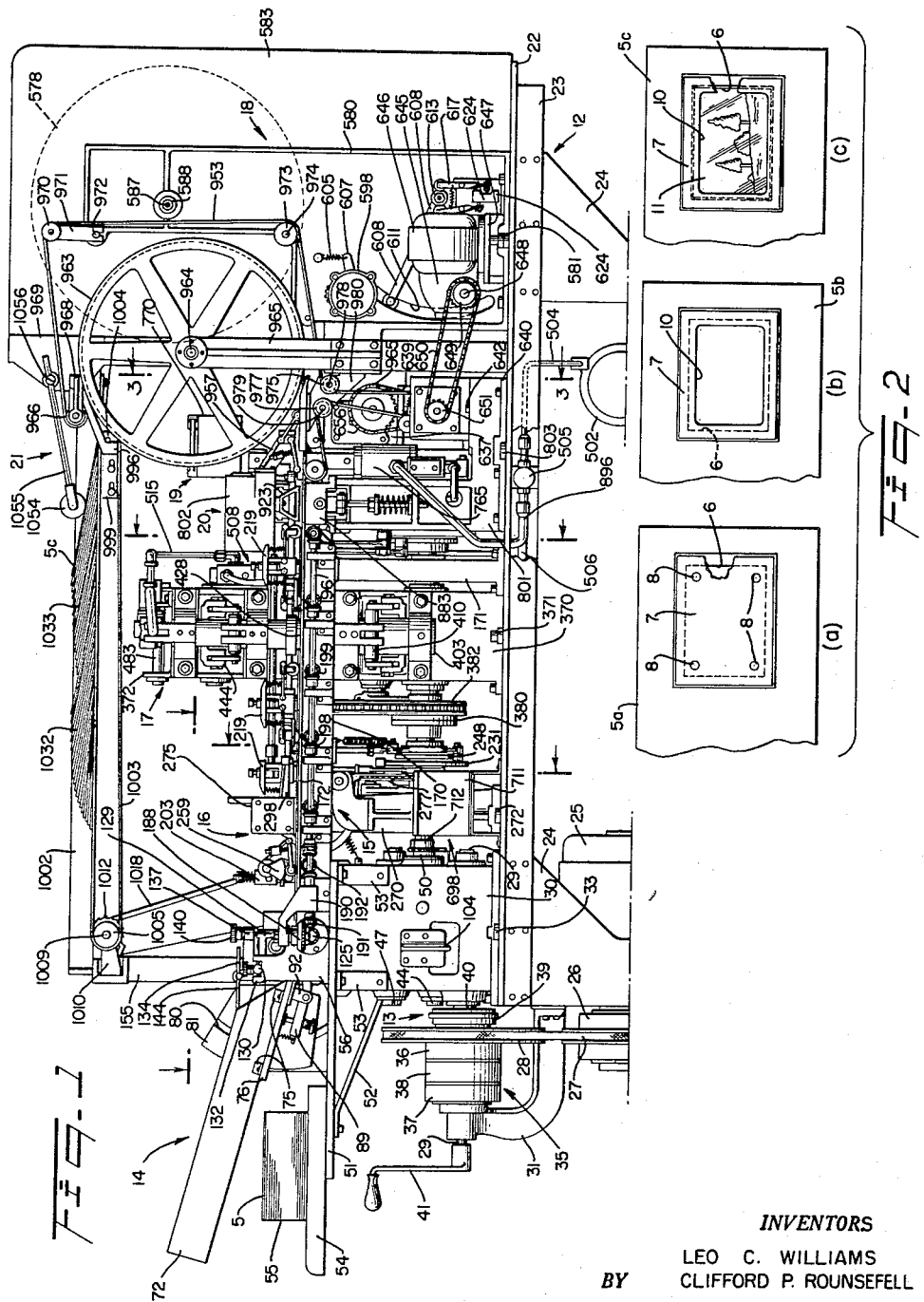
INVENTORS
LEO C. WILLIAMS
BY CLIFFORD P. ROUNSEFELL
Bauer and Seymour
ATTORNEYS

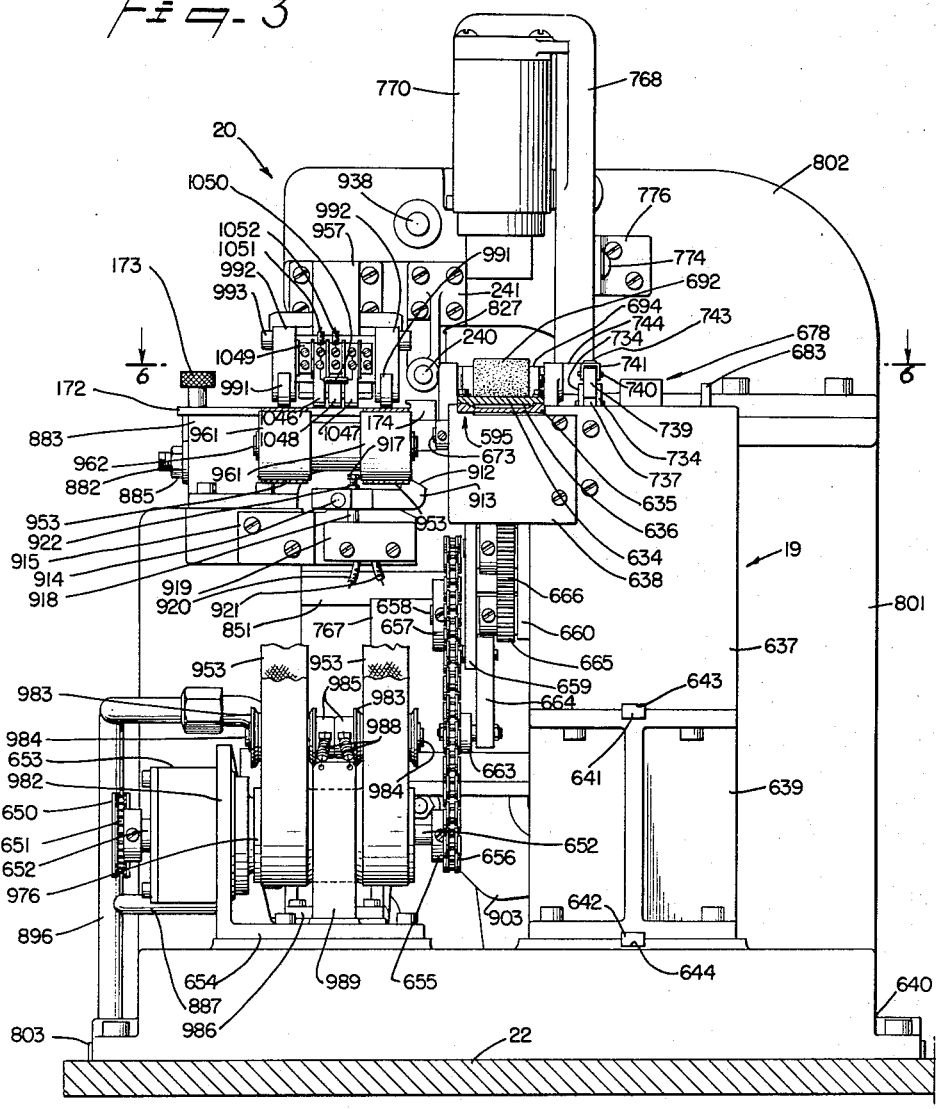

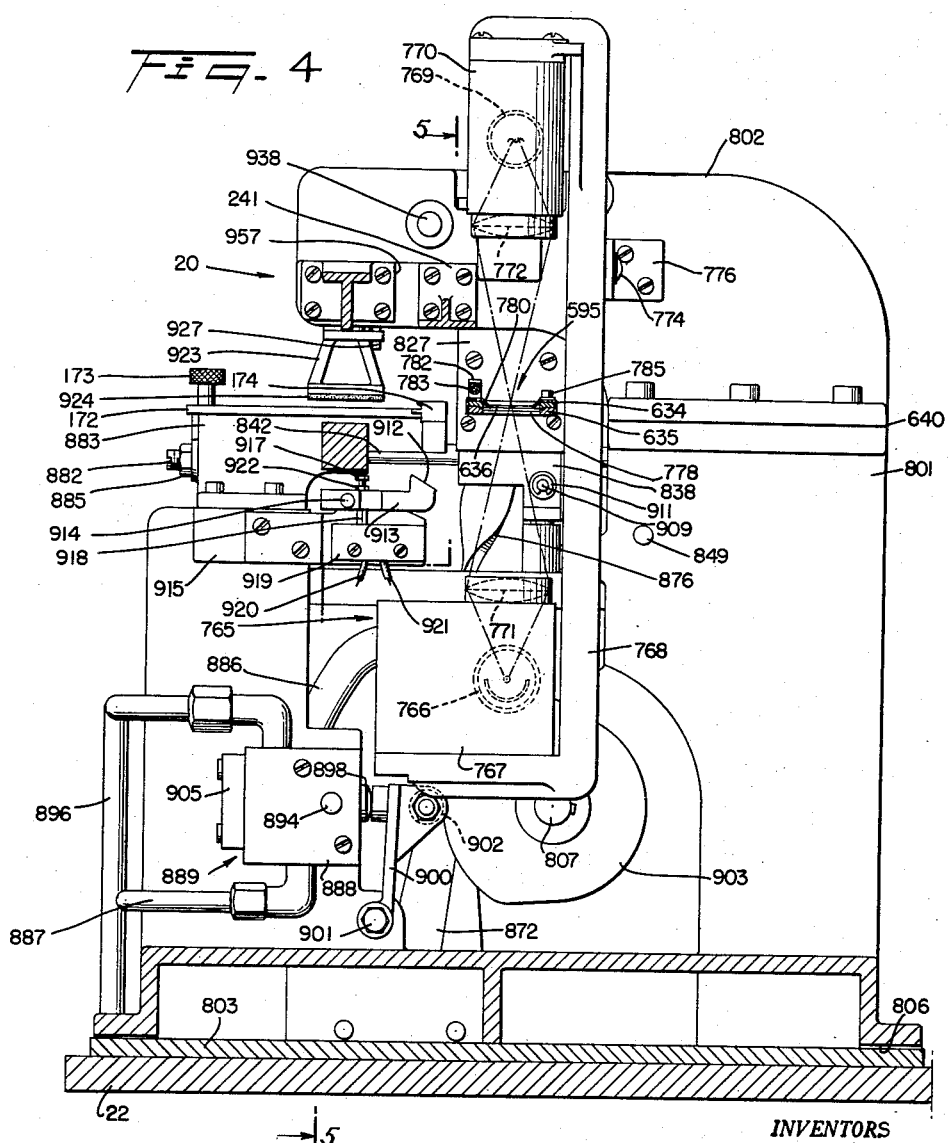

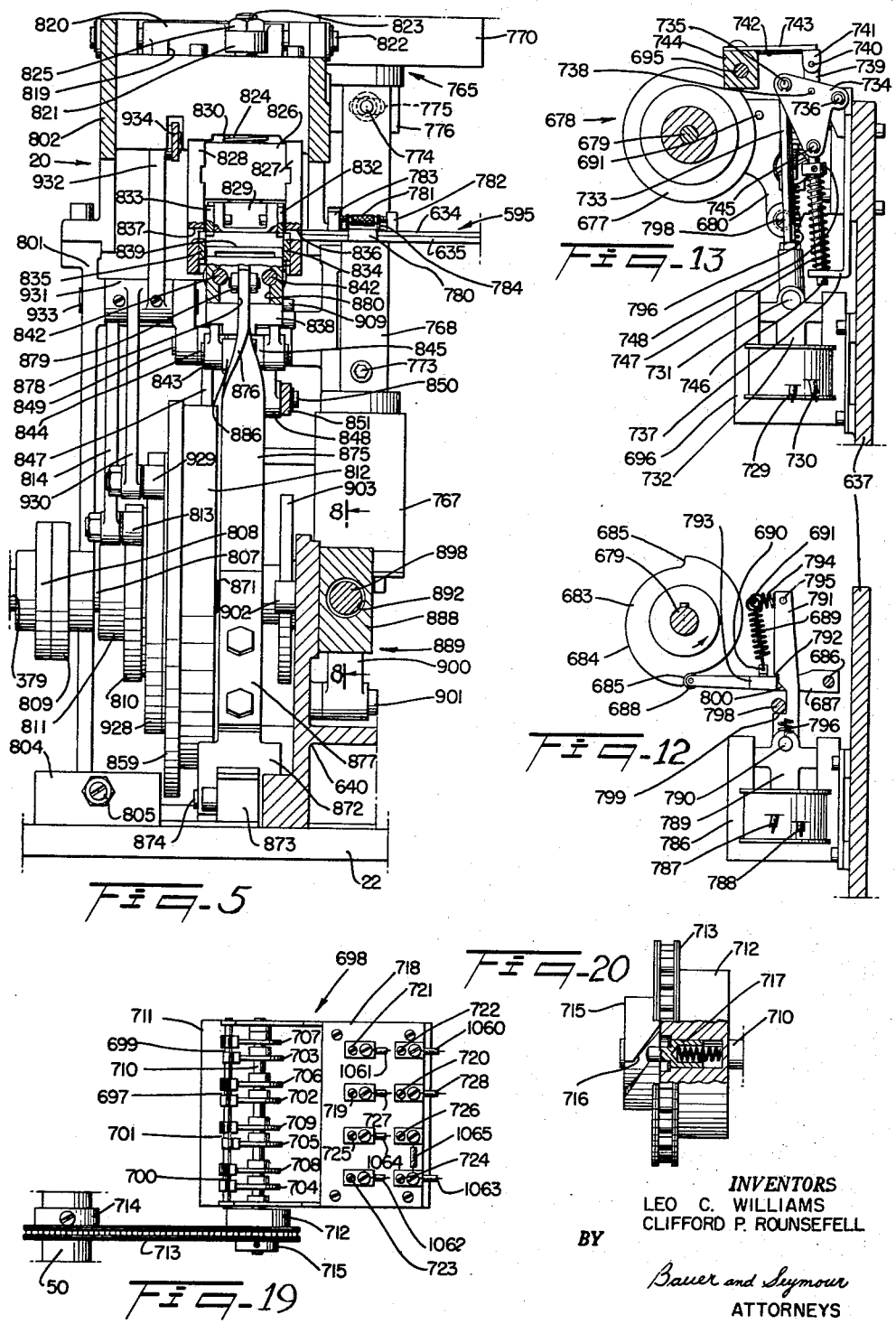

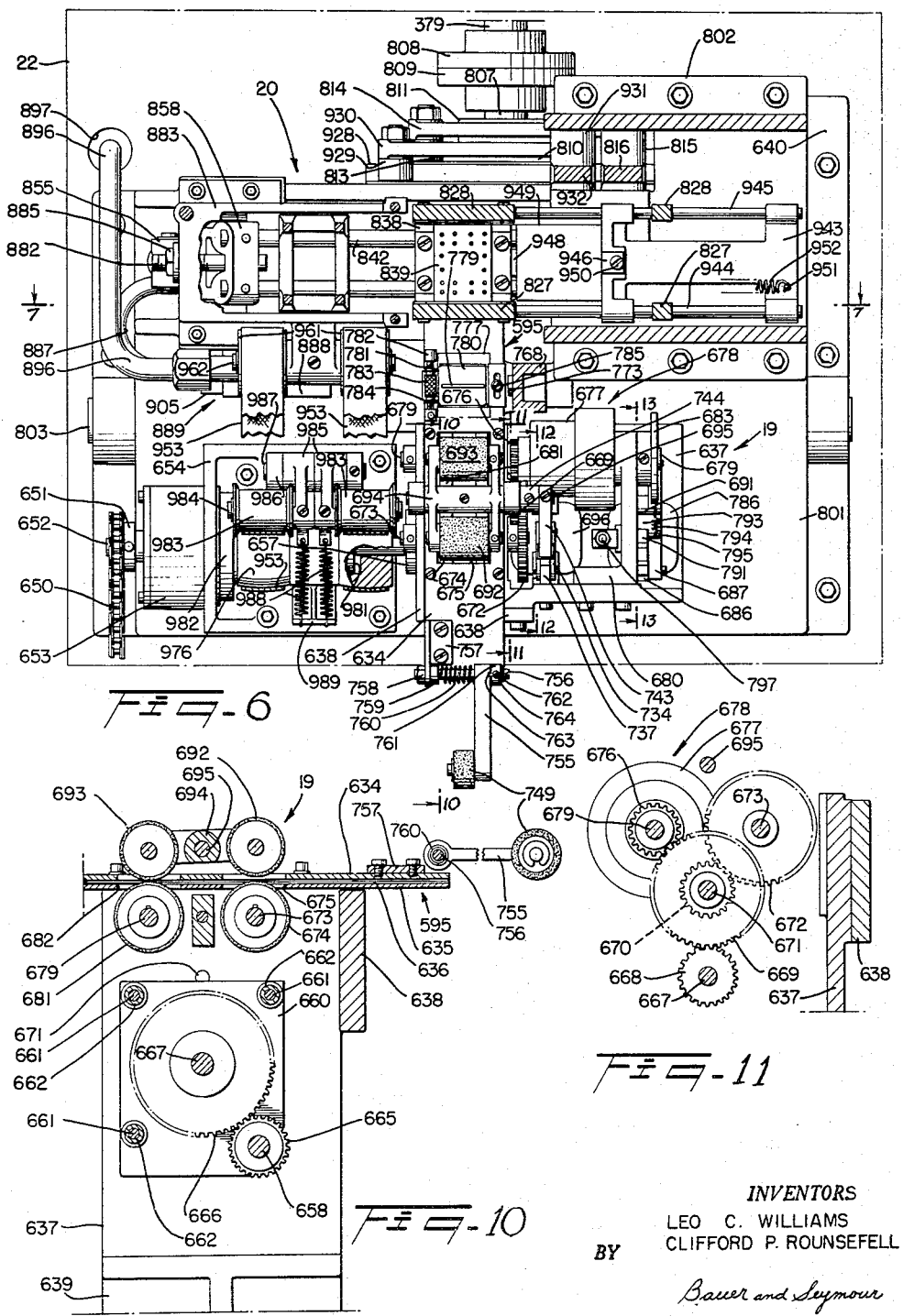

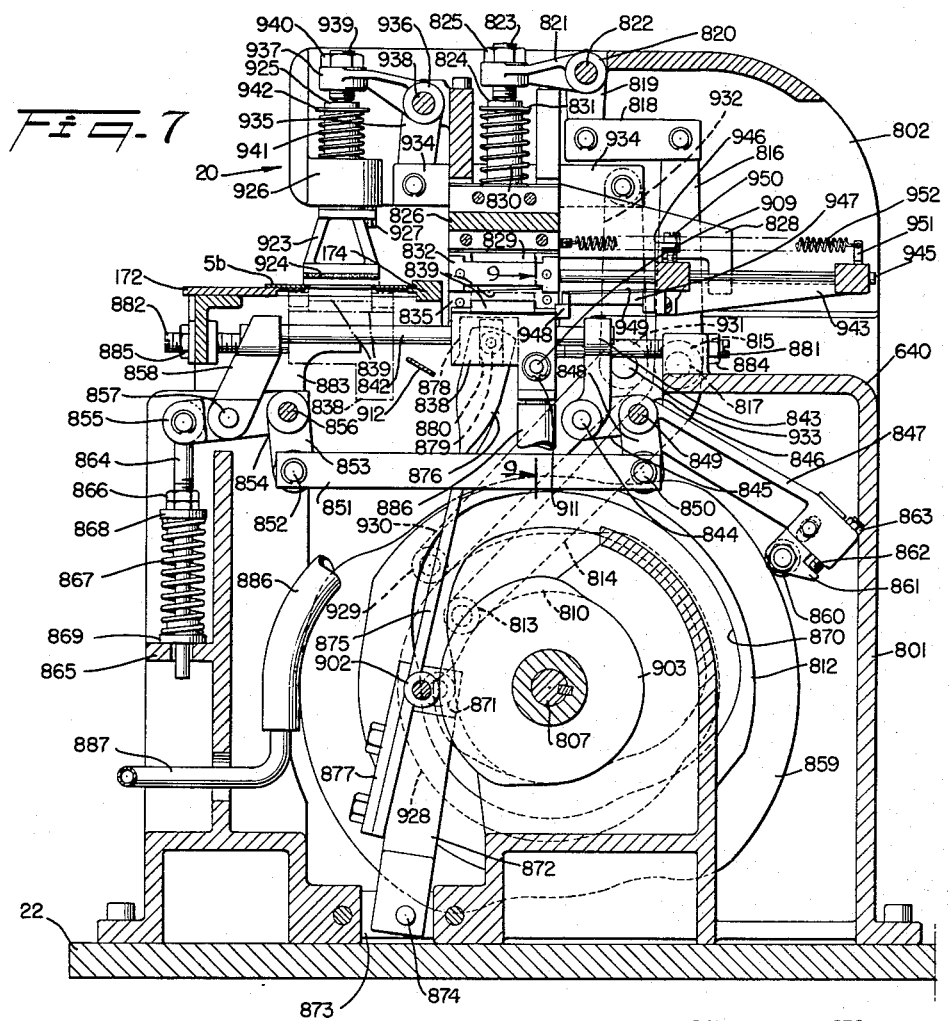
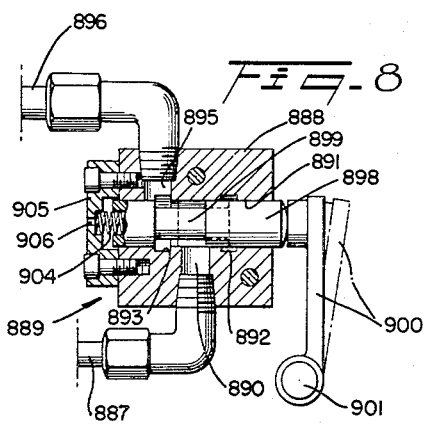
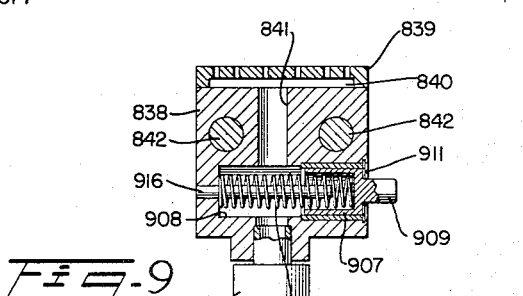
INVENTORS
LEO C. WILLIAMS
CLIFFORD P. ROUNSEFELL
BY
Bauer and Seymour
ATTORNEYS

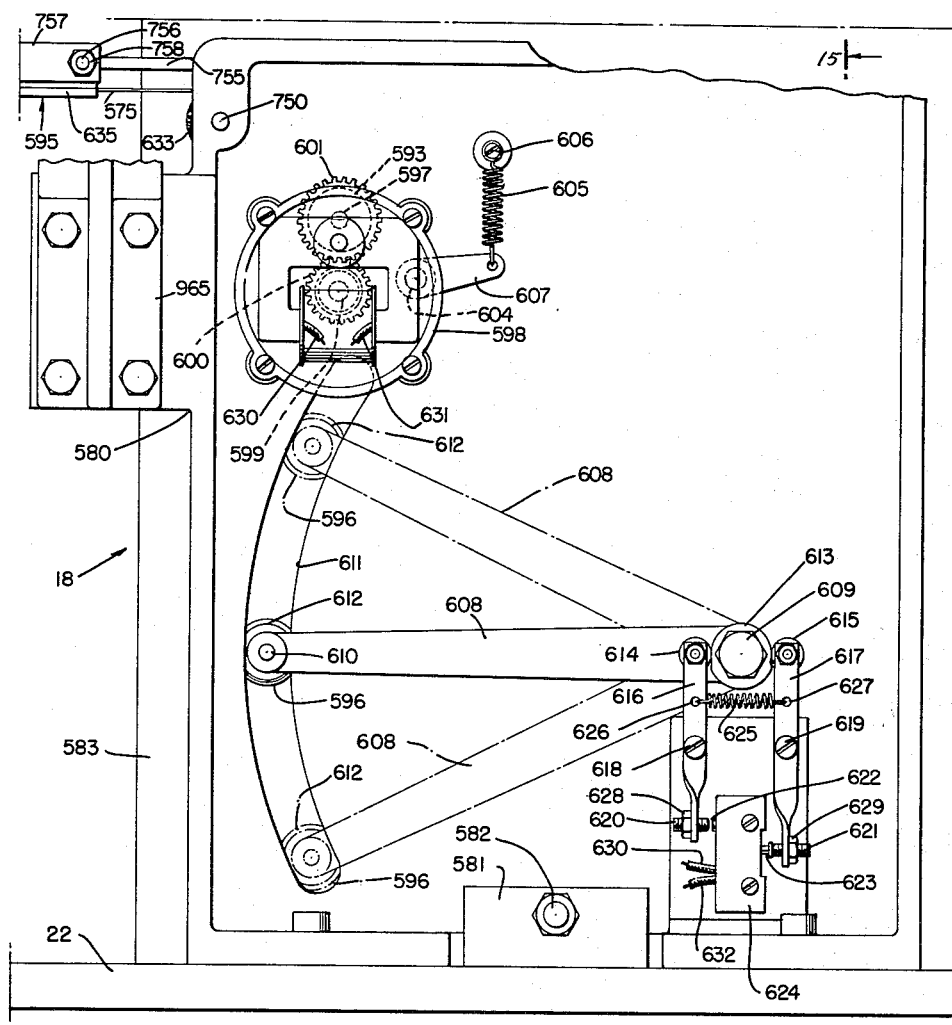

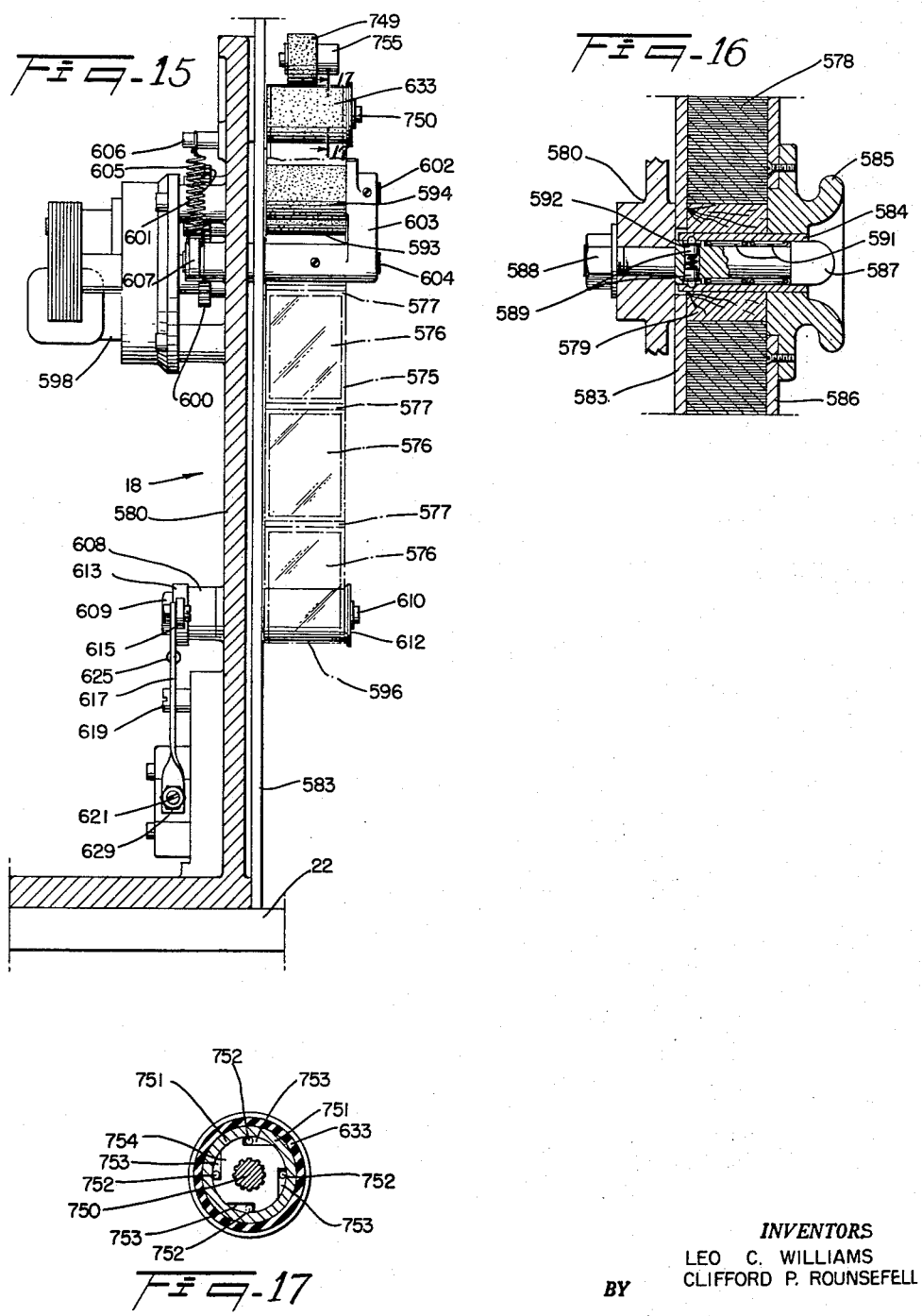

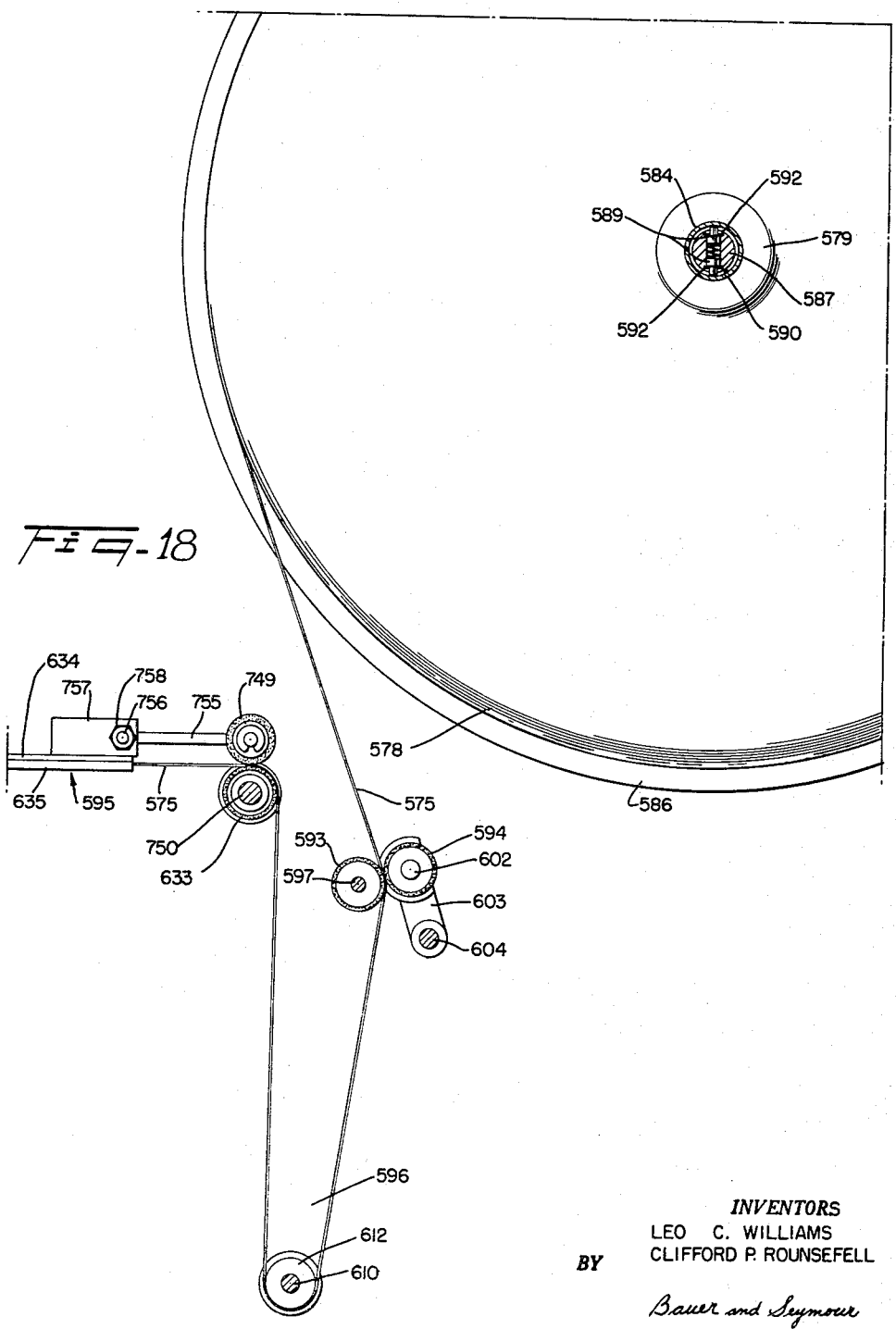

July 27, 1965 L. C. WILLIAMS ETAL 3,197,353
APPARATUS FOR MOUNTING FILMS AND OTHER INSERTS IN CARDS
Original Filed March 28, 1957 10 Sheets-Sheet 10

FIG-21

INVENTORS
LEO C. WILLIAMS
CLIFFORD P. ROUNSEFELL
BY
Bauer and Seymour
ATTORNEYS

United States Patent Office 3,197,353
Patented July 27, 1965

3,197,353
APPARATUS FOR MOUNTING FILMS AND OTHER INSERTS IN CARDS
Leo C. Williams, Pearl River, N.Y., and Clifford R. Rounsefell, Hillsdale, N.J., assignors to Minnesota Mining and Manufacturing Company, St. Paul, Minn., a corporation of Delaware
Original application Mar. 28, 1957, Ser. No. 649,149, now Patent No. 2,987,099, dated June 6, 1961. Divided and this application July 27, 1960, Ser. No. 45,632
21 Claims. (Cl. 156—366)

This invention relates to apparatus which is particularly intended and adapted to produce classification cards, and other cards, each having an image bearing frame of micro-film mounted in an aperture in the card and secured to an adhesive sheet carried by the card and extending over the aperture, whereby each card may advantageously contain a representative visible image or picture record of the data recorded or to be recorded, and each film frame may be conveniently filed, indexed, and classified as to subject matter.

One object of the present invention is to provide novel apparatus which is capable of performing operations on successive cards automatically, accurately and in a reliable manner preparatory to and for the purpose of mounting individual frames of micro-film or other like inserts in apertures in said cards, and of ultimately mounting such frames or inserts in the cards.

Still another object is to provide an independent motorized mechanism of novel construction for unwinding a supply roll of strip material, such as micro-film, and including operable means for forming the strip into a slack loop whereby feeding of said strip from said loop for subsequent operations thereon is facilitated without the load of said supply roll thereon, the operation of said mechanism and the unwinding of the strip from the supply roll being automatically controlled by said loop forming means in response to reduction of the loop to a given size as well as to enlargement of said loop to a given size.

Another object is to provide novel means for rotatably and removably supporting a relatively heavy and large diameter supply roll of micro-film and the like.

Another object is to provide a novel method of intermittently feeding to a cutting device an image bearing strip, such as micro-film, whereby individual sections severed from said strip by said cutting device each will contain a full image with the latter properly centered thereon.

A further object is to provide a novel mechanism for feeding an image bearing strip, such as micro-film, to knife means for severing said strip into individual sections each of a predetermined length and containing a full image, wherein the strip is advanced first a short distance at slow speed so as to enable accurate scanning of the strip by a photo-electric cell and detection by the latter of a narrow line space between adjacent images, and then a further distance at a faster speed so as to quickly and accurately present the strip to said knife means with the center of said narrow line space substantially in registry therewith.

Another object is to provide a novel mechanism for successively receiving individual sections of strip material, such as image bearing frames of micro-film, at one locality, transferring the same from said locality to another locality, and mounting each section at said latter locality in an aperture in a card and against an adhesive sheet on said card.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

This application is a division of our copending patent application Serial No. 649,159, filed March 28, 1957, now U.S. Patent No. 2,987,099, dated June 6, 1961, and said application, as originally filed, forms a part of this disclosure and is incorporated herein by reference.

In the drawings, wherein like reference characters refer to like parts throughout the several views, FIG. 1 is a general assembly view in side elevation of a card preparing apparatus associated with the film handling and mounting apparatus and embodying the principles of the present invention, the supporting base of the apparatus being only partly shown and having a portion thereof broken away for purposes of clearer illustration;

FIG. 2 is a detail face view of a card in completed form with a film frame mounted therein, the film mounting sheet on the card having a portion broken away for purposes of clearer illustration;

FIG. 3 is an enlarged detail elevation, partly in section, of the film feeding, registering, cutting, transferring and mounting unit as seen approximately from the position indicated by the line 3—3 of FIG. 1;

FIG. 4 is an elevational view, partly in section; similar to FIG. 3, but with the film feeding mechanism and driving means therefor omitted and other parts broken away for purposes of clearer illustration;

FIG. 5 is a fragmentary vertical sectional view taken approximately on the irregular line 5—5 of FIG. 4; with parts omitted and portions of certain parts broken away for purposes of clearer illustration;

FIG. 6 is a horizontal sectional view taken approximately on the line 6—6 of FIG. 3, with parts omitted and portions of certain parts broken away for purposes of clearer illustration;

FIG. 7 is a vertical sectional view of said film feeding, registering, cutting, transferring and mounting unit taken approximately on the line 7—7 of FIG. 6;

FIG. 8 is an enlarged vertical sectional view of the vacuum valve shown in FIGS. 4 and 5, said view being taken on the line 8—8 of FIG. 5, and one of the parts having a portion thereof broken away for purposes of clearer illustration;

FIG. 9 is an enlarged vertical sectional view of the film transferring and mounting shuttle shown in FIGS. 4 and 7, inclusive, said view being taken on the line 9—9 of FIG. 7;

FIG. 10 is an enlarged fragmentary vertical sectional view on the line 10—10 of FIG. 6;

FIG. 11 is an enlarged fragmentary vertical sectional view taken on the line 11—11 of FIG. 6;

FIG. 12 is an enlarged fragmentary vertical sectional view taken on the line 12—12 of FIG. 6;

FIG. 13 is an enlarged fragmentary vertical sectional view taken on the line 13—13 of FIG. 6;

FIG. 14 is an enlarged detail elevational view of the film unwinding unit as seen from the near side of the machine as shown in FIG. 1;

FIG. 15 is a vertical sectional view taken approximately on the line 15—15 of FIG. 14;

FIG. 16 is an enlarged fragmentary vertical sectional view of the film supply reel supporting and retaining device;

FIG. 17 is a further enlarged vertical sectional view of the film guiding roller taken approximately on the line 17—17 of FIG. 15;

FIG. 18 is a detail elevational view, partly in section, of parts of the film unwinding unit, including the film supply reel, showing the path of travel of the film from said reel to the film feeding, registering, cutting, transferring and mounting unit;

FIG. 19 is a detail top plan view, on an enlarged scale, of the electrical timing device shown in FIG. 1;

FIG. 20 is a detail elevational view on a further enlarged scale, looking from the right of FIG. 19, showing the driving connection for said timing device, certain of the parts having portions thereof broken away for purposes of clearer illustration; and FIG. 21 is a schematic diagrammatic representation of an electric wiring circuit for the operation and control of the machine.

The apparatus constructed in accordance with the present invention and chosen for the purpose of illustration is particularly adapted for mounting individual image bearing frames of micro-film in cards of the type commonly employed in connection with statistical, tabulating and record card sorting systems and machines. Mounting of film frames in cards of this character advantageously provides such cards with a picture record of the data recorded or to be recorded thereon, and facilitates classifying and sorting of the film frames, as well as filing and indexing thereof, as to subject matter. It is to be understood that the invention is not so limited and that the principles herein described are applicable to the mounting of a variety of different inserts in the cards for the described and other purposes.

There is shown in FIG. 2 a card 5 of the known statistical or tabulating machine type, which is capable of being handled in the machine of the illustrated embodiment. This card 5 is oblong in shape and is formed of single ply cardboard or heavy relatively stiff paper material, and as shown, has been pre-prepared for the mounting of a frame of micro-film or other insert of like size therein. The cards 5, as presented to the machine, are each in the form shown in FIG. 2 and contains a generally rectangular aperture 6 extending therethrough and of an appropriate size to receive a frame of micro-film or other insert of equivalent size therein. The aperture 6 is located centrally between the upper and lower longitudinal edges of the card 5, and inwardly a selected distance from one side edge of said card, and said aperture is made of such width or vertical dimension that it will accurately receive the uncut longitudinal edges of the film frame or other insert. Adhesively secured to one face of the card 5 and covering the entire aperture 6 is a very thin generally rectangular sheet 7 of transparent material which is coated on the inner surface thereof with a layer of pressure sensitive adhesive. To eliminate projecting edges and to avoid increasing the thickness of the card 5, the sheet 7 is preferably embedded in the face of the card so that the outer face of said sheet lies flush with the adjacent face of the card. The sheet 7 is utilized to retain the film frame or other insert in the aperture 6 in the card 5 and to firmly hold said film frame or insert when the same is inserted into said aperture and pressed against said sheet as hereinafter described.

In the embodiment of the invention herein disclosed, the machine, as shown in FIG. 1, includes the following:

(1) A supporting base indicated generally at 12 which is adapted to support various mechanisms of the machine, including a suitable driving mechanism indicated generally at 13;

(2) A card feeder indicated generally at 14 for feeding the cards 5 one after another in timed relation from a supply stack of said cards;

(3) A card conveyor indicated generally at 15 for conveying the cards 5 one after another in spaced relation along a horizontal rectilinear path;

(4) A mechanism indicated generally at 18 for unwinding a supply roll of micro-film or other insert strip;

(5) A feeding mechanism indicated generally at 19 for feeding the film or other insert strip to and in registry with strip severing means;

(6) A cutting, transferring and applying mechanism indicated generally at 20 for severing the film or other insert strip into individual frames or sections, transferring each severed frame or section to card mounting position and applying it in the aperture 6 in the card 5 and against the adhesive sheet 7 on said card, the card as it appears at this final stage with mounted insert being shown in FIG. 2 and the mounted insert being a frame of micro-film and indicated at 11.

The supporting base 12 rests on the machine foundation and comprises a generally rectangular horizontal plate or platform 22, a pair of longitudinally extending bars 23 located at opposite sides of said plate, and two transversely extending standards 24 located at opposite ends of said plate, said plate and said bars being bolted or otherwise suitably secured to said standards, and said plate being also bolted or otherwise suitably secured to said bars. The movable parts of the mechanisms for cutting, transferring and mounting the film sections, together with the card feeder 14 and conveyor 15, are all preferably driven by the driving mechanism 13 which includes an electric motor 25. The motor 25 is carried by the supporting base 12 beneath the platform 22, and is preferably mounted on said base in a suitable manner for pivotal up and down movement for a purpose to be presently described. The motor 25 which is of the single phase type is supplied with electrical current from a suitable source and is controlled for starting and stopping purposes by a suitable manually operated switch which will be later explained in connection with the description of the electrical control circuit illustrated in FIG. 21, for the machine.

The card feeder 14 may be of any suitable design such as that described and illustrated in our said copending patent application.

FILM UNWINDING MECHANISM

FIGS. 1, and 14 to 18, inclusive

The machine is capable of handling a relatively large supply of insert material whereby frequent stopping of the machine for reloading purposes is advantageously avoided, and an increased hourly output of finished cards with inserts mounted therein is advantageously obtained. In this connection, it is pointed out that the supply of cards 5 in the feeder 14 may be and is replenished while the machine is in operation. In the illustrated embodiment, the insert material is in the form of individual frames of exposed image-bearing micro-film, as indicated at 11 in FIG. 2c. It is to be understood that the machine of the present invention is capable of and may be used for mounting inserts of other types and other materials in such and other cards for various purposes, as desired.

The individual micro-film inserts 11 are cut from a supply strip 575 bearing image areas 576 spaced therealong and separated by line-spaces or areas 577 which, as well known in the photographic art, may either be opaque areas or clear transparent areas. The film supply strip 575, as presented to the machine, is wound upon a core 579 forming a roll 578 thereof, and for the purpose of relieving the film strip feeding means of the strain of unwinding the film strip directly from the large and heavy roll thereof, separate power actuated mechanism is provided for unwinding the film strip from the supply roll as required during the normal operation of the machine, and for forming and maintaining at all times in the machine a free loop of said strip. In this manner, the film strip is drawn from the free loop thereof which presents substantially no frictional drag or load on the feeding means, with the result that accurate uniform feeding of given lengths of the film strip by the feeding means is always obtained, and accurate cutting from said strip of individual image-bearing sections of a given length is always assured.

As herein shown, the various stationary and movable parts of the film unwinding mechanism 18, including the film supply roll 578, are mounted on an L-shaped frame 580 which is bolted or otherwise suitably secured to the base plate or platform 22. The film unwinding mechanism 18 is quickly and easily located in its proper position longitudinally and laterally of the machine by a key, keyway and stop block arrangement the same as employed in connection with the previously described mechanisms 16 and 17, the stop block and stop bolt therein only being shown and appearing in FIG. 14 and indicated at 581 and 582, respectively. For purposes which will presently be seen, the frame 580 is located forwardly of the conveyor 15 and near the front end of the platform 22, and such that the upwardly projecting portion thereof is located at the side guide side of said conveyor and is spaced a short distance outwardly from the line of travel of the cards. The vertical portion of the frame 580 extends well above the line of travel of the cards so as to accommodate the large diameter film supply roll 578. The frame 580 has secured to the outer surface of the vertical portion thereof a plate 583 which provides a smooth inner wall for the film supply roll 578.

The film supply roll 578 is mounted in a novel manner on the frame 580 for free and easy rotation relative to said frame. For this purpose, the film supply roll 578 is engaged over a short sleeve 584 which is slidably received in a corresponding opening in the core 579. The sleeve 584 has suitably secured to the outer end thereof a knob 585 for manually rotating the film supply roll 578, the sleeve 584, knob 585 and plate 586 is slipped over and rotatably supported by a spindle 587 which is secured to the frame 580 adjacent the upper end thereof by a nut 588, said unit being removably retained on said spindle by two spring-pressed detents 589 which are carried by the spindle and project radially therefrom into an annular groove 590 formed in the inner wall of the sleeve 584. Engaged over and surrounding the spindle 587 are two anti-friction needle bearings 591 which provide for substantially frictionless rotation of the film supply roll 578. The spindle 587 is counterbored to receive therein snap rings 592 for retaining the detents 589 in said spindle when the sleeve 584 is disengaged therefrom and removed from the spindle to reload the machine with a new supply roll of film.

The film supply strip 575 is led downwardly from the rear side of the supply roll 578 between a rubber-tired feed roller 593 and a cooperating rubber-tired pressure roller 594. From the rollers 593 and 594 the film supply strip 575 is led in slack condition to a horizontal guide 595 so as to form between said guide and said rollers a free loop 596 of said strip. The guide 595 forms part of the film strip feeding and registering mechanism 19 to be hereinafter described. The feed roller 593 is fixed on one end of a stub shaft 597 which projects through a suitable clearance opening in the plate 583 and is journalled at the other end thereof in a suitable bearing in the vertical portion of the frame 580. The feed roller 593 is intermittently rotated during the normal operation of the machine to unwind the film strip 575 from the supply roll 578 as required and thereby maintain at all times in said machine a free loop of said film strip. For this purpose, there is provided a separate electric motor 598 which is of the conventional gear reducing type, needing no detailed description herein. The motor 598 is bolted or otherwise suitably secured to the inner surface of the vertical portion of the frame 580, and the output 599 of said motor has fixed thereon a spur gear 600 which meshes with a somewhat larger spur gear 601 that is fixed on the feed roller shaft 597. The feed roller 593 will thus be rotated by the motor 598 at a desired and proper speed to gently and smoothly unwind the film strip 575 from the supply roll 578 in cooperation with the pressure roller 594. The pressure roller 594 is journaled on a pin 602 which is secured at the outer end thereof to a flanged arm 603 which is disposed outwardly of said roller. The arm 603 is pivotally mounted on the vertical portion of the frame 580 by a stub shaft 604 which is secured in an elongated hub on said arm and projects through a suitable clearance opening in the plate 583 and is journalled in a suitable bearing in said frame portion. The arm 603 and consequently the pressure roller 594 carried thereby is yieldingly urged toward the feed roller 593 by a coil extension spring 605 to maintain said pressure roller engaged with the film supply strip 575 and to yieldingly press the latter against said feed roller. The spring 605 is located at the inner side of the vertical portion of the frame 580 and has one end thereof connected at 606 to said frame portion and the other end connected to the free end of an arm 607 which is secured to the projecting inner end of the stub shaft 604.

During the normal operation of the machine, the electric motor 598 is controlled such that it is started to effect rotation of the feed roller 593 and unwinding of a length of the film strip 575 thereby from the supply roll 578 when the free loop 596 of said strip has become reduced to a predetermined size and before it has completely disappeared, and is stopped to discontinue such unwinding of the film strip when the free loop is again increased to a predetermined normal size. When the free loop 596 is reduced to the desired minimum size thereof it extends below the rollers 593 and 594 to the upper broken line position shown in FIG. 14, and when said loop is increased to the desired maximum size thereof it extends farther below said rollers to the position shown in FIG. 18 which corresponds to the lower broken line position thereof shown in FIG. 14. In this manner, the free loop 596 will never become too small or too large, and there will always be maintained in the machine a free loop of the film strip to insure accurate performance of feeding, registering and cutting operations on said strip.

This starting and stopping of the electric motor 598 is effected under the control of the free loop 596 of the film strip 575 and is accomplished through the prevision of a relatively long lever 608 which is located at the inner side of the vertical portion of the frame 580 and is loosely mounted at one end thereof on said frame portion for free pivotal movement in a vertical plane by a stud 609 which is suitably fixed in said frame portion. The lever 608 has secured in the other end thereof a horizontal pin 610 which projects laterally from said lever beyond the plate 583 through aligned arcuate slots formed in said plate and the vertical portion of the frame 580 concentric with the pivotal axis 609 of said lever, only the slot in said frame portion being seen and indicated at 611. The pin 610 has journalled thereon a flanged roller 612 which is disposed within the free loop 596 of the film strip 575 and continuously rests by gravity thereon under the weight of said roller and the lever 608. The peripheral surface of the roller 612 is preferably smooth and highly polished so as not to scratch or otherwise injure the images on the film strip 575. It will be apparent that as the size of the free loop 596 of the film strip 575 is reduced through feeding of said strip from said loop, as hereinafter described, the lever 608, through engagement of the roller 612 with the free loop, will be raised or rocked in a clockwise direction, as viewed in FIG. 14, by the diminishing free loop, and when the size of the free loop is increased through unwinding of the film strip from the supply roll 578, the lever 608 will follow by gravity with the free loop as it increases and, hence, said lever will be lowered or rocked in a counterclockwise direction.

Engaged over the stud 609 and suitably secured to the lever 608 for rotation thereby in opposite directions as said lever is raised and lowered, respectively, as above described, is a cam 613 which is engaged at opposite sides thereof by cam followers or rollers 614 and 615 which are journalled on and at the upper ends of vertical arms 616 and 617, respectively. These arms 616 and 617 are pivotally mounted intermediate the ends thereof at 618 and 619, respectively, on the vertical portion of the frame 580, and the lower end portions of said arms are twisted to dispose the same substantially at 90° to the upper remaining portions of said arms. Adjustably threaded in the twisted lower end portions of the arms 616 and 617 are machine screws 620 and 621, respectively, which are arranged to respectively engage the contact closing plunger 622 and the contact opening plunger 623 of a conventional micro-switch 624 which is suitably secured to the vertical portion of the frame 580. The micro-switch 624 is of the resetting type which requires actuation of the plunger 623 to open the contacts thereof when once closed by the plunger 622, and requires actuation of the plunger 622 to close said contacts when once opened by the plunger 623, said plungers, however, being capable of returning to their original projected positions when released and permitted to do so by their respective screws 620 and 621. The cam rollers 614 and 615 are yieldingly held in engagement with the cam 613, and the lower end portions of the arms 616 and 617 are yieldingly urged away from the switch 624, by a coil extension spring 625 having one end thereof connected at 626 to the arm 616 and the other end connected at 627 to the arm 617. With the cam rollers 614 and 615 engaged in the low part of the cam 613, as shown in FIG. 14, and with the switch 624 open at this time and the motor 598 accordingly stopped, the screws 620 and 621 are adjusted so that they just contact their respective projected plungers 622 and 623, said screws being then locked in adjusted positions by lock nuts 628 and 629, respectively. The motor 598 and the micro-switch 624 are electrically connected together by a conductor 630, and said motor and said switch are connected by conductors 631 and 632, respectively, in the electrical control circuit for the machine, as illustrated in FIG. 21 and to be hereinafter described.

The length of the high part of the cam 613 and the position of said cam on the lever 608 are so chosen, that when said lever occupies a position substantially centrally between the upper and lower limits of pivotal movement thereof, as shown in full lines in FIGURE 14, the cam rollers 614 and 615 are both engaged in the low part of said cam and positioned alike distances away from the ends of the high part of said cam. At this time, the length of the free loop 596 of the film strip 575 is substantially one-half its maximum size, the plungers 622 and 623 of the switch 624 are released by the arms 616 and 617, respectively, said switch is open and no electrical current is being conducted to the motor 598.

It will thus be apparent that when the free loop 596 of the film strip 575 is reduced to its minimum size and consequently the lever 608 is raised by said loop to the upper broken line position thereof shown in FIG. 14, thereby rotating the cam 613 in a clockwise direction, the cam roller 614 will be engaged by the high part of said cam, while the cam roller 615 will continue to engage the low part of the cam. Under these conditions, the arm 616 only is rocked in a counterclockwise direction about its pivot 618 by the cam 613, thus actuating the plunger 622 of the switch 624 and closing the contacts of said switch. Closing of the contacts of switch 624 starts the motor 598, whereupon the rollers 593 and 594 are rotated and the film strip 575 is drawn thereby from the supply roll 578 and added to the diminished free loop 596. As the film strip 575 is drawn from the supply roll 578 and the length or size of the free loop 596 thus increases, the lever 608 drops by gravity with the increasing free loop, thereby rotating the cam 613 in the opposite or counterclockwise direction. When the lever 608, during continued downward pivotal movement thereof with the still increasing free loop 596 of the film strip 575, substantially reaches the midway position thereof, the high part of the cam 613 will leave the cam roller 614, whereupon the arm 616 is rocked about its pivot 618 in a clockwise direction by the action of the spring 625 and the plunger 622 of the switch 624 is released by said arm and returns to its original projected position. The contacts of the switch 624, however, remain closed and, hence, the motor 598 continues to operate, and unwinding of the film strip 575 from the supply roll 578 continues until the lever 608 reaches its lower broken line position shown in FIG. 14 and the free loop 596 is accordingly extended to said position. Thereupon, the cam roller 615, through continued rotation of the cam 613 in a counterclockwise direction by the downwardly moving lever 608, is engaged by the high part of said cam and the arm 617 is rocked in a clockwise direction about its pivot 619, thus actuating the plunger 623 of the switch 624 and opening the contacts of said switch. With the free loop 596 of the film strip 575 thus restored to its maximum size, opening of the contacts of the switch 624 stops the motor 598, thereby interrupting the unwinding of the film strip 575 from the supply roll 578. As the film strip 575 is fed from the restored free loop 596 thereof, the lever 608 is raised from its lower broken line position shown in FIG. 14, and when said lever, during such upward movement thereof, substantially reaches its midway position, the high part of the cam 613 will leave the cam roller 615. Thereupon, the arm 617 is rocked about its pivot 619 in a counterclockwise direction by the action of the spring 625, and the plunger 623 of the switch 624 is released by said arm and returns to its original projected position, thus resetting said switch for subsequent operation in the manner above described.

FILM STRIP FEEDING AND REGISTERING MECHANISM

*FIGS. 1, 3, 4, 5, 6, 10 to 15, inclusive, 17, and 18*

The film strip 575 is led from the free loop 596 thereof over a rubber-tired roller 633, to be hereinafter referred to, and threaded through the horizontal guide 595 which forms part of the mechanism 19 for intermittently feeding said strip from said loop and registering the same with knife means, to be hereinafter described, whereby individual frames severed from the strip by said knife means each will contain a full image properly centered thereon. It might be repeated at this time, that the aperture 6 in the card 5 is made of such width or vertical dimension that it accurately receives the uncut longitudinal edges of the film frame or insert severed from the film strip. In this manner, the full width of the film strip is economically utilized, and at the most two transverse cuts extending completely across the strip are only required to produce an insert of a length to accurately fit within the aperture 6 in the card 5. It will thus be seen that in the case of the image bearing film strip in the illustrated embodiment, or any other record or indicia bearing strip, a very high degree of accuracy is required in the feeding of the strip to the cutting means. As herein shown, the film strip feeding and registering mechanism 19 comprises the following elements, including the guide 595, which are constructed, mounted, operated and controlled as follows.

The guide 595 is located in line with the film strip supply roll 578 to receive the film strip 575 in a straight line from the free loop 596 thereof and, hence, said guide is also located at the side guide side of the machine and is laterally spaced a selected distance from the line of travel of the cards. The guide 595 consists of two complementary elongated members 634 and 635 which, when placed together, define a shallow horizontal guide passage 636 of rectangular transverse section. The film strip 575 enters the passage 636 at the right-hand end of the guide 595, as viewed in FIGS. 10 and 18, and is advanced step-by-step along said guide passage to the zone of action of cutting means to be hereinafter described. The guide 595 is mounted on top and at the inner side of a frame 637 and on top and at the confronting outer side of a bracket 638 disposed in spaced parallel relation to said frame. The guide 595 bridges the space between the frame 637 and the bracket 638 and is suitably secured to said frame and said bracket. The bracket 638 is bolted or otherwise suitably secured to the frame 637, and said frame is bolted or otherwise suitably secured to an auxiliary base block or pedestal 639. This block or pedestal 639 is bolted or otherwise suitably secured to the base portion of a frame 640 which forms part of the film strip cutting, film frame transferring and mounting mechanism 20 to be later described. Location of the frame 637 and the pedestal 639 in proper positions on said pedestal and the frame 640, respectively, is facilitated by keys 641 and 642 secured to the upper and lower surfaces, respectively, of the pedestal and engaged in keyways 643 and 644, respectively, formed in the frames 637 and 640, respectively.

The various operable parts of the film strip feeding and registering mechanism 19 are driven from a speed reduction drive unit 645 which includes an electric motor 646 coupled thereto and forming a part thereof. This combined unit 645, 646 is slidably mounted on and bolted or otherwise suitably secured to a plate 647 which, in turn, is bolted or otherwise suitably secured to the base portion of the frame 580 of the previously described film unwinding mechanism 18. The electric motor 646 is connected in the electrical control circuit for the machine and is controlled for starting and stopping purposes by a manually operated switch which will be later explained in connection with the description of said circuit. Fixed on the output shaft 648 of the speed reduction drive unit 645 is a sprocket 649 around which passes a chain 650 which also passes around a smaller diameter sprocket 651. This sprocket 651 is fixed on the inwardly projecting end of a horizontal transverse shaft 652 which is journalled adjacent said end in a suitable bearing block 653 carried by a bracket 654 which is located directly below the line of travel of the cards and is bolted or otherwise suitably secured to the frame 640. Slack in the chain 650 is compensated for by sliding the driving unit 645, 646 on and relative to the supporting plate 647. The shaft 652 projects through and beyond the bearing block 653 and the bracket 654 and has fixed on the extreme outer end thereof a sprocket 655 around which passes a chain 656. The chain 656 extends upwardly from the sprocket 655 and passes around a larger diameter sprocket 657 which is fixed on the inner end of a stub shaft 658. This stub shaft 658 is journalled in suitable bearings provided in two plates 659 and 660 which are located below the guide 595 and are bolted together in spaced parallel relation and to the frame 637 by bolts 661 which pass through clearance openings in said plates and through spacers 662 between said plates and are threaded into said frame. Slack in the chain 656 is compensated for by an idler sprocket 663 which is journalled on and at the free end of an arm 664 which is carried by and is adjustably secured to the plate 659.

The sprocket 657 is disposed exteriorly of the plate 659, and the stub shaft 658 driven by said sprocket has fixed thereon between the plates 659 and 660 a spur pinion 665 which meshes with a larger diameter spur gear 666 which is fixed on a stub shaft 667. This stub shaft 667 is journalled in suitable bearings in the plates 659 and 660 and projects beyond the adjacent inner wall of the frame 637 through a suitable clearance opening in said wall. The stub shaft 668 has fixed on the outwardly projecting end thereof a spur pinion 668 which measures with the larger diameter spur gear 669 of a compound idler gear which includes a smaller diameter spur gear 670 secured to or formed integrally with the gear 669. The compound idler gear 669, 670 is journalled on a stud 671 which is suitably secured in the frame 637. The smaller gear 670 of the compound idler meshes with and drives a larger diameter spur gear 672. This gear 672 is fixed on the outwardly projecting end of a stub shaft 673 which extends transversely of the guide 595 beneath the latter and is journalled in suitable bearings in the frame 637 and bracket 638. The stub shaft 673 has keyed thereon a rubber-tired feed roller 674 which is located between the frame 673 and the bracket 638 and projects through the lower member 635 of the guide 595 through an enlarged opening 675 in said guide member so as to engage, and to be engaged by, the film strip 575 disposed within and extending along the guide passage 636.

The larger gear 669 of the compound idler meshes with and drives a smaller diameter spur gear or pinion 676 which is secured to the driven member 677 of a friction slip clutch 678 which is engaged over a shaft 679 extending transversely of the guide 595 beneath the latter. The shaft 679 is disposed in parallel relation to the feed roller shaft 673 and is spaced a selected distance rearwardly from said feed roller shaft. The shaft 679 has its inner end portion journalled in suitable bearings in the bracket 638 and the frame 637, and is also journalled adjacent the outer end thereof in a suitable bearing in another bracket 680 which is bolted or otherwise suitably secured to said frame. The slip clutch 678 is of conventional design embodying the clutch member 677 which is loosely mounted on the shaft 679, and a series of friction discs (not shown) which are disposed within said clutch member and cooperate with the latter and with each other to drive said shaft, certain of said discs being connected to the clutch member 677 and others being connected to the shaft 679. The shaft 679 has keyed on the inner end portion thereof a rubber-tired feed roller 681 which is located between the frame 637 and the bracket 638 and projects through the lower member 635 of the guide 595 through an enlarged opening 682 in said guide member so as to engage, and to be engaged by, the film strip 575 disposed within and extending along the guide passage 636.

The shaft 679 projects beyond the bracket 680 and has fixed on the outer end thereof a cam disc 683 formed with two alike cam surfaces 684 which terminate in two alike radially extending shoulders or abutments 685 disposed diametrically opposite each other and facing in the direction of rotation of said shaft. The bracket 680 has pivotally mounted thereon at 686 one end of a stop lever 687 having journalled thereon at the other end thereof a roller 688 which is adapted to normally engage one or the other of the two shoulders 685 on the cam disc 683 and thus normally hold the shaft 679 and consequently the feed roller 681 against rotation in opposition to the driving torque of the clutch 678, said clutch slipping at this time and thus having no affect on the operation of the speed reduction drive unit 645. The stop lever 687 is continuously biased toward the cam disc 683 by a coil extension spring 689 having one end thereof connected at 690 to said lever and the opposite end engaged over a pin 691 suitably secured in the bracket 680. It will be apparent that when the stop lever 687 is rocked out of engagement with the cam disc 683, as hereinafter described, thereby releasing said disc, rotation will immediately be imparted to the shaft 679 and the feed roller 681 by the speed reduction drive unit 645 through the described gearing, including the clutch 678. When the stop lever 687 is rocked toward the cam disc 683 by the action of the spring 689 substantially immediately following the release of said disc by said lever, the roller 688 will engage and ride along the succeeding cam surface 684 on the disc so that the succeeding shoulder 685 on said disc will engage said roller, thus stopping the disc after it has made exactly one-half of a revolution and limiting the rotation of the feed roller 681 to exactly one-half of a revolution.

During the normal operation of the machine, the electric motor 646 is operated continuously, and it will thus be apparent that the feed roller 674 is rotated continuously and that by virtue of the speed reduction drive unit 645 and the described gearing for said feed roller such rotation of the latter occurs at a very slow surface speed. Accordingly, the film strip 575 engaged by the feed roller 674 will be advanced by said roller at a very slow surface speed along the guide 595. It will also be apparent that the feed roller 681, through the described gearing therefore, including the clutch 678, with the continuously driven speed reduction drive unit 645, will be rotated by said unit when released by the stop lever 687, and that by virtue of said gearing such rotation of said roller will occur at a surface speed faster than the surface speed of the continuously driven feed roller 674. Accordingly, the film strip 575 engaged by the feed roller 681 will be advanced by said roller at a faster surface speed along the guide 595 independently of the feed roller 674.

Cooperating with the feed rollers 674 and 681 to increase the tractive effort of said rollers on the film strip 575 and to insure movement of said strip along the guide 595 at slow speed by the feed roller 674 and at a faster speed by the feed roller 681, as above described, are upper rubber-tired pressure rollers 692 and 693, respectively. These pressure rollers 692 and 693 are journalled on and at opposite ends of a rocker arm 694 which is pivotally mounted centrally of said ends on a stub shaft 695 that is secured in the frame 637 and the bracket 638. It will be apparent that by virtue of the described mounting for the pressure rollers 692 and 693, when the pressure roller 692 is moved toward the feed roller 674 and the film strip 575 is pressed thereby against said feed roller to effect advancing movement of said film strip, the pressure roller 693 is simultaneously moved away from the feed roller 681 which at this time is stationary, thus enabling movement of the film strip 575 at slow speed along the guide 595 by the feed roller 674. When the pressure roller 693 is moved toward the feed roller 681 and the film strip 575 is pressed thereby against said feed roller to effect advancing movement of said film strip, the pressure roller 692 is simultaneously moved away from the feed roller 674 and out of engagement with the film strip 575, thus enabling free advancing movement of said film strip at a faster speed along the guide 595 by the feed roller 681.

Rocking movement of the rocker arm 694 in a clockwise direction, as viewed in FIG. 10, to bring the pressure roller 692 into pressing engagement with the film strip 575 within the guide 595 is timed to occur once during each cycle of operation of the machine, and is effected electrically by energization of a solenoid 696. The operation of this solenoid 696 is under the control of an electric timing switch 697 which forms part of a multiple circuit timer utilized in the machine and indicated generally at 698 in FIGS. 1 and 19. The timer 698 is of conventional design, embodying the switch 697, and other similar switches 699, 700 and 701 to be hereinafter referred to, and two driven rotary cams for each of said switches to open and close the contacts thereof at predetermined intervals, the contact closing cams being indicated at 702, 703, 704 and 705, respectively, and the contact opening cams being indicated at 706, 707, 708 and 709, respectively. The cams 702 to 709, inclusive, are fixed in pairs on a shaft 710 which is journalled in suitable bearings in a casing 711. During the normal operation of the machine, the shaft 710 is rotated continuously and such that it makes one complete revolution for each cycle of operation of the machine. For this purpose, the timer 698 is mounted on and suitably secured to the base plate or platform 22 in front of the cover sheet stripping mechanism 16, and the shaft 710 of said timer has mounted thereon a sprocket 712 around which passes a chain 713 which also passes around and is driven by a similar sprocket 714 that is fixed on the main cam shaft 50 of the machine, said sprockets being of the same size.

To prevent possible damage to the timer 698 upon manual rotation of the cam shaft 50 in a reverse direction for any reason, the sprocket 712 is loosely mounted on the timer shaft 710 and is connected to said shaft by a slip coupling (FIG. 20) comprising a collar 715 which is fixed on the shaft adjacent said sprocket and is formed in the peripheral surface thereof with a spiral groove 716, and a spring-pressed plunger 717 which is slidably mounted in the sprocket 712 and is arranged to yieldingly project into the groove 716 and engage the leading wall of said groove, said wall being flattened at the inner end thereof parallel to the axis of rotation of the collar 715 so as to provide more surface contact of said plunger with said collar. During the normal operation of the machine, the timer shaft 710 will thus be driven in the proper direction by the sprocket 712 through engagement of the plunger 717 with the flat portion of the leading wall of the spiral groove 716 in the collar 715, and when the machine is stopped and the cam shaft 50 is manually rotated in the reverse direction for some reason, the plunger 717, through reverse rotation of the sprocket 712, will engage the inclined trailing wall of the spiral groove 716 in the collar 715 and, hence, said plunger will be cammed out of driving engagement with said collar and no reverse rotation will be imparted to the timer shaft 710. The outer end of the trailing wall of the spiral groove 716 in the collar 715 is also flattened so that the ends of said groove are interchangeable for the described purpose, thereby simplifying the mounting of the collar on the shaft 710 and providing for prolonged use of said collar in the machine. The timer 698 includes a terminal block 718 which is suitably secured to the casing 711 and to which the conductors (not shown) leading from the contacts of the various switches 697, 699, 700 and 701 are connected at 719 and 720, 721 and 722, 723 and 724, and 725 and 726, respectively. The terminals 719 and 720 appertaining to the switch 697 have connected thereto conductors 727 and 728 which are connected in the electrical control circuit for the machine as more fully explained hereinafter in the description of said circuit.

Referring back to the solenoid 696 for operating the rocker arm 694, said solenoid is bolted or otherwise suitably secured to the frame 637 and has conductors 729 and 730 leading therefrom which are connected in the electrical control circuit for the machine, as illustrated in FIG. 21. Pivotally connected at 731 with the movable core 732 of the solenoid 696 is the lower end of a vertical link 733 the upper end of which extends between two spaced parallel plates 734 of triangular shape and is pivotally connected at 735 to said plates. The plates 734 are pivotally mounted at 736 on a bracket 737 which is bolted or otherwise suitably secured to the frame 637. Disposed between the plates 734 and pivotally connected to said plates at 738 intermediate the pivotal points 735 and 736 is the lower end of a short vertical link 739 the upper end of which is received within and is pivotally connected at 740 to the U-shaped portion 741 of a resilient arm 742 formed of spring steel. This arm 742, together with a shorter, more rigid metallic strip 743 disposed above the same, is secured at the other end thereof to a block 744 which is suitably secured to the projecting end of the stub shaft 695 to which the rocker arm 694 is secured. The plates 734 have pivotally connected thereto at 745 the upper end of a rod 746 which projects downwardly from said plates and has its lower end disposed within and projecting through a suitable clearance opening formed in the bracket 737. Surrounding the rod 746 is a coil compression spring 747 having one end thereof engaging against the bracket 737 and the opposite end engaging against a collar 748 which is adjustably secured to said rod.

It will thus be apparent that when the solenoid 696 is energized through closing of the timer switch 697 by the timer cam 702, the core 732 will be electrically drawn downwardly and, hence, the rocker arm 694, through the described operating connections therefor with said core, will be rocked about the pivotal axis 695 in a clockwise direction, as viewed in FIG. 10, until the pressure roller 692 on said arm contacts the film strip 575, whereupon the resilient arm 742 will yield under the continued downward pull of the core 732 and said film strip will be yieldingly pressed by said pressure roller against the feed roller 674. When the solenoid 696 is thereafter deenergized, as explained hereinafter in connection with the description of the electrical control circuit for the machine, the plates 734 will be rocked about the pivotal axis 736 thereof in a clockwise direction, as viewed in FIG. 13 by the expanding action of the spring 747, whereupon the core 732 will be raised, and the rocker arm 94 will be rocked in a counterclockwise direction, as viewed in FIG. 10, until the pressure roller 693 on said arm contacts the film strip 575 and yieldingly presses the same against the feed roller 681, at which time the pressure roller 692 is raised clear of said film strip.

It is apparent that while the pressure rollers 692 and 693 are being lowered and raised, as above described, into and out of engagement with the film strip 575 in the guide 595, there is a brief moment when said film strip is not engaged by or under the control of either roller and, hence, the film strip at this moment is entirely free in said guide and would be retracted from its proper normal longitudinal position in the guide under the influence of the lever 608 on the free loop 596 of said strip. Brake means is, therefore, provided for continuously holding the film strip 575 against any retracting movement relative to the guide 595, while at all times permitting feeding movement of said strip by the feed rollers 674 and 681. As herein shown, said brake means comprises the rubber-tired idler roller 633, previously referred to, and a spring-pressed rubber-tired pressure roller 749 cooperating with said idler roller to pinch the film strip 575 therebetween. The idler roller 633 is slidably engaged over a fixed stub shaft 750 which extends through a suitable clearance opening in the plate 583 and is suitably secured in the vertical portion of the frame 580. The idler 633 is connected to the stub shaft 750 by a coupling in the form of an over-running clutch (FIG. 17) which is disposed within said roller and utilizes the inner shell 751 of the roller as a component part thereof. The clutch includes a series of spring-biased rollers 752 which are disposed in notches 753 formed in the periphery of a member 754 which is splined or otherwise suitably secured to the stub shaft 750. By virtue of the over-running clutch type of coupling, the idler roller 633 is free for rotation at all times, in a counterclockwise direction, as viewed in FIG. 17, relative to the member 754, by the film strip 575 as the latter is advanced along the guide 595 from the free loop 596 thereof by the feed rollers 674 and 681. This is due to the fact that rotation of the idler roller 633 in the film strip feeding direction causes the rollers 752 to move into the deep ends of the notches 753 and rotate freely therein without transmitting any binding action between the surfaces of the shell 751 and member 754. However, it will be apparent that if the idler roller 633 is rotated in a clockwise direction, as viewed in FIG. 17, the rollers 752 are immediately urged toward the shallow ends of the notches 753, thereby locking said idler roller against the member 754 and preventing rotation of said idler roller in said direction. Since the film strip 575 is normally pinched by and between the idler roller 633 and the pressure roller 749, retracting movement of said film strip relative to the guide 595 is thus normally prevented.

The pressure roller 749 is journalled on and at one end of an arm 755 which is pivotally mounted at the other end thereof on a stub shaft 756 which extends transversely of the guide 595 and is adjustably secured at the inner end thereof in a bracket 757 by a nut 758, said shaft being formed adjacent said shaft being formed adjacent said bracket with an enlarged annular portion 759. The bracket 757 is bolted or otherwise suitably secured to the upper member 634 of the guide 595. A torsion spring 760 encircles the shaft 756 and has its inner end engaged in a suitable opening in the portion 759 of said shaft and its outer end engaged in a suitable opening in the arm 755. A collar 761 is mounted on the outer end of the shaft 756 and is engaged by the arm 755, said arm and said collar being retained on said shaft against axial outward displacement therefrom by a snap ring 762 which is engaged in a suitable annular groove in said shaft. The collar 762 is normally free on the shaft 756 and is formed on the inner surface thereof with a radial lug 763 which projects into a corresponding radial recess formed in the adjacent surface of the arm 755, whereby said arm and the pressure roller 749 thereon may be raised away from the idler roller 633 and held in elevated position by tightening a set screw 764 provided in the collar, so as to facilitate threading of the film strip 575 over said idler roller and into the guide 595. By loosening the nut 758 and rotating the shaft 756 the tension of the spring 760 may be increased or decreased as desired, following which said nut is again tightened.

The previously described slow speed advancing movement of the film strip 575 along the guide 595 effected by the continuously driven feed roller 674 and cooperating pressure roller 692, is advantageously and effectively utilized to provide for accurate and reliable scanning of said film strip and detection of each line-space or area 577 separating adjacent image-bearing areas 576 of the strip by a photo-electric cell unit indicated generally at 765, whereby the operation of the feed roller 674 and the feed roller 681 and, hence, the feeding of the film strip 575 thereby to strip severing means to be hereinafter described, it effectively controlled to insure accurate registry of the images on said film strip with said severing means such that the film strip will be severed on the line-spaces substantially centrally thereof into individual frames each containing a full image located substantially centrally thereon.

The photo-electric cell unit 765 is suitably mounted to scan the slow moving film strip 575 at a selected point which, in the illustrated embodiment, is located between the feed roller 681 and the strip severing means and is spaced from said severing means a distance less than the length of one image-bearing film frame as measured between the centers of adjacent line-spaces 577 defining said frame. This location of the photo-electric cell unit 765 in relation to the strip severing means provides for feeding of the film strip 575 first at slow speed through part only of the distance by the feed roller 674 to bring the trailing line-space 577 into scanning position, and then at a faster speed the remainder of the distance by the feed roller 681 to quickly bring said line-space into registry with said strip severing means.

As herein shown, the photo-electric cell unit 765 is preferably, but not necessarily, located below the guide 595 and comprises a photo-electric cell 766 enclosed in a suitable casing 767 which is suitably secured to the lower horizontal portion of a vertically extending bracket 768. A source of light in the form of an electric lamp 769 for the photo-electric cell 766 is provided and located above the guide 595 in vertical alignment with said cell. The lamp 769 is enclosed in a suitable casing 770 which is suitably secured to the upper horizontal portion of the bracket 768. The casing 767 is provided at the top thereof with a suitable lens system 771, and the casing 770 is provided at the bottom thereof with a suitable lens system 772, said lens systems serving to concentrate the light beam from the lamp 769 upon the photo-electric cell 766, as indicated by the broken lines in FIG. 4. The bracket 768 is mounted by a bolt 773 on the frame 640 for pivotal movement longitudinally of the guide 595 to locate the photo-electric cell 766 and the light source 769 in proper position with respect to said guide. The bracket 768 is maintained in adjusted position by tightening the bolt 773, and by a second bolt 774 which extends through a clearance slot 775 in an angle bracket 776 and is threaded into the bracket 768, said angle bracket being bolted or otherwise suitably secured to the frame 640.

The upper and lower members 634 and 635, respectively, of the guide 595 are provided with registering openings 777 and 778, respectively, for transmission of the light beam therethrough and for scanning of the film strip 575 by the photo-electric cell 766. The light rays from the lamp 769 are passed through a narrow transverse slot 779 formed in a mask 780 which is mounted on the upper member 634 of the guide 595. The mask 780 is adjustable longitudinally of the guide 595 to proper position by means of a threaded pin 781 which is secured at opposite ends thereof in spaced posts 782 and has threaded thereon a knurled adjusting nut 783 which is confined between two upstanding ears 784 formed on said mask, said posts being suitably secured to the upper guide member 634. Rotation of the nut 783 will thus impart longitudinal movement to the mask 780 relative to the guide 595. The mask 780 is maintained in its adjusted position by a machine screw 785 which extends through a suitable slot in said mask and is threaded in the upper guide member 634.

As will be hereinafter explained in connection with the description of the electrical control circuit for the machine, the photo-electric cell 766 is connected in said circuit such that when a line-space 577 on the slow moving film strip 575 registers with the slot 779 in the mask 780, thereby affecting the light directed through said slot into said cell, the photoelectric cell, in response to such change in light, simultaneously causes the breaking of the electric circuit in which the solenoid 696 is connected and the closing of another electric circuit in which is connected a solenoid 786 which controls the operation of the faster speed feed roller 681. Under these conditions, the slow movement of the film strip 575 is interrupted through de-energizing of the solenoid 696 and lifting of the pressure roller 692 from said strip as hereinbefore described, and simultaneously therewith and with engagement of the pressure roller 693 with the film strip the rotation of the faster speed feed roller 681 is initiated. Thereupon, the feed roller 681 makes one-half of a revolution, thus continuing the advance of the film strip 575 but at a faster speed, and presenting said strip to the strip severing means with the leading image 576 thereon in proper registry with said severing means.

The solenoid 786 is operatively associated with the stop lever 687 to rock the same away from the cam disc 683 when energized, as previously described, and thereby release said disc and provide for rotation of the faster speed feed roller 681. For this purpose, the solenoid 786 is bolted or otherwise suitably secured to the frame 637 and has conductors 787 and 788 leading therefrom which are connected in the electrical control circuit for the machine, as illustrated in FIG. 21. The movable core 789 of the solenoid 786 has pivotally connected thereto at 790 the lower end of a vertically disposed latch member 791 which is formed with a downwardly facing shoulder 792 which normally projects over a laterally offset portion 793 of the stop lever 687. The latch member 791 is biased toward and into engagement with the portion 793 of the stop lever 687 by a short coil extension spring 794 having one end thereof engaged over the pin 691 and the opposite end connected at 795 to said latch member. The core 789 of the solenoid 786 and the latch member 791 are biased upwardly to their normal positions by a coil extension spring 796 having one end thereof connected at 790 and the opposite end connected at 797 to the bracket 680. A stop pin 798 is suitably secured in the bracket 680 and is arranged to be engaged by an upwardly facing shoulder 799 on the latch member 791 so as to limit the upward movement of said latch member by the spring 796 such that shoulder 792 in the normal position of the latch member is spaced upwardly from the portion 793 of the stop lever 687 by a minimum clearance. The latch member 791 is also formed with a downwardly facing cam surface 800 which is adapted to engage the stop pin 798.

It will thus be apparent that when the solenoid 786 is energized, the core 789 thereof and the latch member 791 will be drawn electrically downwardly and, hence, the stop lever 687, through engagement of the portion 793 thereof by the shoulder 792 on said latch member, will be rocked downwardly about its pivot 686 away from the cam disc 683 and thereby release said disc. Simultaneously with such release of the cam disc 683 by the stop lever 687, the faster speed feed roller 681 is rotated. Upon continued downward pull of the core 789 and the latch member 791, the cam surface 800 on said latch member will engage the stop pin 798 and, hence, said latch member will be cammed out of engagement with the stop lever 687, whereupon said stop lever will be returned to its original position by the contracting action of the spring 689 into the path of rotation of the succeeding shoulder 685 on the cam disc 683 to stop said disc after it and the feed roller 681 has made one-half of a revolution. When the solenoid 786 is thereafter deenergized, as will be hereinafter explained in connection with the description of the electrical control circuit for the machine, the core 789 of said solenoid and the latch member 791 will be raised relative to the stop lever 687 by the contracting action of the spring 796 until the shoulder 792 on said latch member is clear of the portion 793 of said stop lever at which time the stop pin 798 is engaged by the shoulder 799 on the latch member. Thereupon, the latch member 791 is rocked toward and into engagement with the portion 793 of the stop lever 687 by the contracting action of the spring 794, thus restoring said latch member to its original position in readiness to again actuate said stop lever when the solenoid 786 is again energized during the next cycle of operation of the machine.

FILM STRIP SEVERING AND FILM FRAME TRANSFERRING AND MOUNTING MECHANISM

FIGS. 1, and 3 to 9, inclusive

From the film strip guide 595, the film strip 575, fed and registered as above described by the coordinated actions of the photo-electric cell 766 and the primary and secondary feeding means comprising the feed roller 674 and pressure roller 692, and the feed roller 681 and pressure roller 693, respectively, is presented to the mechanism 20 such that the leading image-bearing portion or frame thereof is accurately positioned for severance of said portion on and substantially centrally of the line-space 577 between said portion and the next following image-bearing portion. The mechanism 20, in addition to the film strip severing means, includes carrier means for transferring the severed image-bearing frame of the film strip 575 to a position below the card 5b in vertical alignment with the aperture 6 in said card and for mounting said frame vertically in said aperture and against the adhesive marginal portion of the adhesive sheet 7 on the card, and anvil means arranged above the card for holding the latter against upward movement and providing a backing for the adhesive sheet during mounting of the severed film frame in said card by said carrier means. The film strip severing means, the film frame carrier means and the anvil means are comprised by the following instrumentalities which are constructed, assembled, mounted and operated as follows.

The frame 640, previously referred to, of the mechanism 20 is mounted on the base plate or platform 22 and consists of a lower section 801 and an upper section 802 which is bolted or otherwise suitably secured to said lower section at the top thereof. The frame 640 and consequently the mechanism 20 is quickly and easily located in proper position longitudinally and laterally of the machine by a key 803 and a stop block 804 having threaded therein an adjustable stop bolt 805, said key and said block being suitably secured to the upper surface of the platform 22. The frame 640 is provided in the lower surface of the lower section 801 thereof with a suitable keyway 806 to receive the key 803, and when so engaged, said frame is moved along said key and the platform 22 until it contacts the stop bolt 805. Following this, the frame 640 is immovably bolted to the platform 22.

The various operable parts of the mechanism 20 are actuated in proper timed relation from a short shaft 807 which extends longitudinally of the machine and transversely of the frame 640 and is journalled in suitable bearings in the lower section 801 of said frame. The shaft 807 is located coaxially with the shaft 379, and said shafts are connected together by a conventional disc-type coupling having one part 808 which is keyed and suitably secured to the shaft 379 and another part 809 which is bolted to the part 808 and is keyed and suitably secured to the shaft 807. The shaft 807 forms in effect a further extension of the cam shaft 50 and, hence, it is also driven to make one complete revolution for each cycle of operation of the machine and may be correctly referred to as the cam shaft of the mechanism 20.

Located between the frame 640 and the coupling 808, 809 is a cam 810 which is bolted or otherwise suitably secured to the hub 811 of a face cam 812 to be hereinafter referred to and which is keyed on and suitably secured to the cam shaft 807. The cam 810 engages a cam follower 813 which is journalled on and at the free lower end of one arm 814 of a bell-crank lever 815 the other arm of which is indicated at 816. This bell-crank lever 815 is suitably secured to a stub shaft 817 which is journalled at opposite ends thereof in suitable bearings in the lower section 801 of the frame 640. The arm 816 of the lever 815 extends upwardly from the pivotal axis 817 and has pivotally connected thereto at the upper free end thereof the rear end of a horizontal link 818. The front end of this link 818 is pivotally connected to the free lower end of one arm 819 of a bell-crank lever 820 the other arm of which is indicated at 821. This bell-crank lever 820 is suitably secured to a stub shaft 822 which is journalled at opposite ends thereof in suitable bearings in the upper section 802 of the frame 640. The arm 821 of the lever 820 projects toward the front of the frame 640 and has adjustably threaded in the free end thereof a tappet 823 which engages the upper end of a vertical stem 824 and is locked in adjusted position by a lock nut 825. The stem 824 is slidably mounted for vertical up and down movement in a bearing block 826 which is disposed between and is bolted or otherwise suitably secured to two vertically disposed side plates 827 and 828 which are bolted or otherwise suitably secured to the upper section 802 of the frame 640. The side plates 827 and 828 are disposed at right angles to the line of travel of the cards on the conveyor, and they project toward the back of the frame 640 for a purpose to be hereinafter described. With the card 5b in its arrested position against the stop finger 237, the bearing block 826 and the side plates 827 and 828 are symmetrically disposed at opposite sides of the transverse center line of the aperture 6 in said card, and said plates are spaced apart a distance slightly in excess of the length or longer dimension of said card aperture.

The stem 824 projects downwardly beyond the bearing block 826, and said stem has secured thereto or formed integrally therewith at the lower end thereof a rectangular holder 829 which is positioned so that two opposed sides thereof are parallel to the side plates 827 and 828. Surrounding the projecting upper end of the stem 824 is a coil compression spring 830 having one end thereof engaging against the bearing block 826 and the opposite end engaging against a snap ring 831 which is engaged in a suitable annular groove formed in said stem. The spring 830 functions to yieldingly urge the stem 824 and holder 829 upwardly to their normal raised positions shown in FIG. 7, and to also yielding hold the cam follower 813 in engagement with the cam 810.

Bolted to the side of the holder 829 facing the film strip guide 595 is a flat knife blade 832, and bolted to the opposite side of said holder is another flat knife blade 833. The knife blades 832 and 833 are vertically positioned on the holder 829 such that the lower surfaces thereof are flush with the lower flat surface of said holder. Cooperating with the knife blades 832 and 833 are stationary knife blades 834 and 835, respectively. These knife blades 834 and 835 are recessed into the inner surfaces of the side plates 827 and 828 and they are preferably tipped at a slight angle in a vertical plane to effect a shearing action. At least the outer lower edges of the knife blades 832 and 833, and the confronting inner upper edges of the knife blades 834 and 835 are formed as cutting edges, but in the illustrated embodiment, all four longitudinal edges of each of the knife blades are formed as cutting edges so as to prolong the use of said blades in the machine before replacements thereof are necessary. The film strip guide 595 extends to the side plate 827, and said plate and the side plate 828 are formed with transversely extending horizontally disposed film strip receiving passages 836 and 837, respectively. The lower surfaces of the passages 836 and 837 are flush with the upper surfaces of the stationary knife blades 834 and 835, respectively, and in the normal raised or retracted positions of the movable knife blades 832 and 833 the latter blades are spaced upwardly from the stationary knife blades 834 and 835, respectively.

The film strip 575 as advanced along the guide 595 by the primary and secondary feed rollers 674 and 681, respectively, as above described, passes from said guide through the passage 836 in the side plate 827, over the stationary knife blade 834, across the space between said knife blade and the other stationary knife blade 835, and over the latter knife blade, and when such advancing movement of said film strip is stopped, the leading edge of the film strip will slightly overlie the stationary knife blade 835, and the center of the line-space 577 immediately following the leading image-bearing portion of said strip will substantially overlie the active cutting edge of the stationary blade 834. It will thus be apparent that when the cam follower 813 is thereafter engaged by the high part of the cam 810 through continued rotation of said cam, the holder 829, through the described operating connections therefor with said cam, will be lowered to move the knife blades 832 and 833 thereon past the lowest points of the active cutting edges of the stationary knife blades 834 and 835, respectively. Under these conditions, the leading image-bearing portion of the film strip 575 will be shearingly severed from said strip on the line-space 577 by the cooperating knives 832 and 834, and said portion will be shearingly trimmed to a given size at the leading edge thereof by the cooperating knife blades 833 and 835 so that the severed image-bearing portion or frame will accurately fit between the end walls of the aperture 6 in the card 5b, as hereinafter described. Upon continued rotation of the cam 810 and engagement of the cam follower 813 with the low part of said cam, the movable knife blades 832 and 833 are raised or retracted to their original positions by the expanding action of the spring 830 in readiness to again act on the film strip 575 during the next cycle of operation of the machine when said film strip has again been advanced to position the next following image-bearing portion thereof in registry with said knife blades and the stationary knife blades 834 and 835, at which time the above-described operations are repeated. The lower surfaces of the passages 836 and 837 are preferably chamfered at the outer edges thereof so as to respectively lead the film strip 575 into the passage 836 and to eject the trimmings or shavings of said strip from within the passage 837.

The severed and trimmed image-bearing portion of the film strip 575 is deposited by the movable knife blades 832 and 833 and the holder 829 upon a carrier or shuttle which is normally located between the knife blades 834 and 835 and is in the form of a rectangular vacuum head 838, best seen in FIG. 9, having suitably secured to the upper surface thereof a flanged, rectangular, perforated plate 839. The length and width of the perforated plate 839 is substantially the same as the length and width of the severed and trimmed image-bearing portion of the film strip 575 and slightly smaller than the length and width of the aperture 6 in the cards 5 so as to enable movement of said plate with said image-bearing portion into said card aperture, as hereinafter described. The perforations in the plate 839 communicate with a shallow chamber 840 formed in the lower surface of said plate, and said chamber, in turn, communicates with a vertically disposed passage 841 formed in the head 838.

The carrier 838, 839 is shown in full lines in FIG. 7 in the lowered rearmost positions which it occupies with respect to the stationary knife blades 834 and 835, and it will be noted that in such positions, the carrier plate 839 is located centrally between the opposite ends of said knife blades and directly below the position occupied by the film strip 575. When the carrier 838, 839 is actuated during the normal operation of the machine, as hereinafter described, it is moved upwardly an extent to bring the perforated plate 839 to the broken line position thereof shown in FIG. 7 in which the upper surface of said plate is disposed slightly below the lowermost active points of the cutting edges of the stationary knife blades 834 and 835 so as to directly receive the severed and trimmed image-bearing portion of the film strip 575. After receiving the severed and trimmed image-bearing portion of the film strip 575 and said portion is gripped by vacuum by the carrier plate 839, the carrier is lowered and moved longitudinally of the frame 640 to the left as viewed in FIG. 7, an extent to bring the carrier plate with the image-bearing portion thereon to a position in which it is directly below and in accurate registry with the open end of the aperture 6 in the card 5b resting on the card supporting plate 172, as shown in broken lines in FIG. 7. Then and finally, the carrier 838, 839 with the severed and trimmed image-bearing portion of the film strip 575 adhering by vacuum to the plate 839 is moved upwardly an extent so as to mount said image-bearing portion in the aperture 6 in the card 5b and to press the same against the adhesive sheet 7 on said card, as shown in broken lines in FIG. 7. Just before or at the same time that the severed and trimmed image-bearing portion of the film strip 575 is applied by the carrier 838, 839 to the adhesive sheet 7 on the card 5b, vacuum in said carrier is broken to release said image-bearing portion. After the image-bearing portion of the film strip 575 is applied to the adhesive sheet 7 on the card 5b, the carrier 838, 839 is lowered, retracted and raised in readiness to receive the next severed and trimmed image-bearing portion of the film strip 575 during the next cycle of operation of the machine, at which time the above-described operations are repeated to mount said image-bearing portion in the next card 5b which has been previously advanced along the conveyor and into engagement with the stop finger 237.

The carrier 838, 839 is slidably mounted on two spaced parallel horizontal rods 842 which extend longitudinally of the frame 640 from a position spaced rearwardly of the knife blades 832, 833, 834 and 835 to a position beneath the card supporting plate 172 and beyond the normal position occupied by the card 5b on said plate. The rods 842 are slidably received in suitable bearings in the carrier head 838, and said rods are suitably secured at the rear ends thereof to and at the upper free end of a vertical arm 843 which is pivotally connected at the lower end thereof by a pin 844 with one arm 845 of a lever 846 having two other arms 847 and 848. The arm 847 of the lever 846 extends downwardly at an angle toward the back of the frame 640, and the arm 848 of said lever extends downwardly at right angles to the arm 845 which extends toward the front of said frame. The lever 846 is pivotally mounted on a transverse pin 849 which is suitably secured at opposite ends thereof in the lower section 801 of the frame 640. The arm 848 of the lever 846 has pivotally connected to the lower free end thereof by a pin 850 the rear end of a horizontal link 851 the front end of which is pivotally connected by a pin 852 to the lower free end of one arm 853 of a bell-crank lever 854 having another arm 855 which extends toward the front of the frame 640. The bell-crank lever 854 is pivotally mounted on a transverse pin 856 which is suitably secured at opposite ends thereof in the lower section 801 of the frame 640. Pivotally connected by a pin 857 to the arm 855 of the lever 854 is the forked lower end of an upwardly extending arm 858. This arm 858 has suitably secured therein at the upper free end thereof the forward ends of the rods 842. The described mounting for the carrier 838, 839 thus provides for straight-line vertical and horizontal reciprocating movements of said carrier, as and for the purpose above described. It is evident that vertical reciprocating movement will be imparted to the carrier 838, 839 twice during each cycle of operation of the machine, and that horizontal reciprocating movement will be imparted to said carrier once during said cycle.

For this purpose, there is bolted or otherwise suitably secured to the hub 811 of the box cam 812 a double cam 859 which engages a cam follower 860 journalled on a holder 861 which is releasably clamped to and at the free end of the arm 847 of the lever 846. The arm 847 has threaded therein an adjusting bolt 862 which engages the holder 861 and is locked in adjusted position by a lock nut 863. The cam follower 860 may thus be adjusted relative to the lever 846 toward and away from the cam 859 by rotating the bolt 862 in the proper direction, whereby the desired extent of upward movement of the carrier 838, 839 to receive the severed film section, and the desired degree of pressure applied thereby in mounting said film section in the card 5b may be accurately and conveniently achieved. The carrier 838, 839 is yieldingly urged in an upward direction, and the cam follower 860 is yieldingly held in engagement with the cam 859, by a vertically disposed spring-pressed rod 864 which is pivotally connected at the upper end thereof to and at the free end of the arm 855 of the bell-crank lever 854. The lower end of the rod 864 extends through a suitable clearance opening formed in a web 865 of the lower section 801 of the frame 640, and said rod has threaded thereon adjusting nuts 866. The spring for the rod 864 is of the coil compression type indicated at 867 and surrounds said rod between washers 868 and 869 which are loosely carried by the rod and engage the nuts 866 and the web 865, respectively. It will be apparent that the carrier 838, 839 will be yieldingly raised bodily by the spring-pressed rod 864 under the control of the cam 859, and will be positively lowered bodily by said cam, and that through continued rotation of the cam 859 such raising and lowering movements will occur twice at spaced intervals during each cycle of operation of the machine, i.e., when the carrier is disposed in its rearmost film section receiving position and again when it is disposed in its foremost film section mounting position.

Horizontal reciprocating movement is imparted to the carrier 838, 839 along the rods 842 by the face cam 812 previously referred to. For this purpose, the cam groove or path 870 of the cam 812 has engaged therein a cam follower 871 which is journalled on and at the free upper end of a vertically disposed arm 872. This arm 872 is forked at the lower end thereof to extend on opposite sides of a block 873 which is bolted or otherwise suitably secured to the lower section 801 of the frame 640, said arm being pivotally mounted at said end on a pin 874 which is suitably secured in said block and projects beyond opposite sides thereof. Bolted to the front side of the arm 872 is a relatively thin flat bar 875 which extends upwardly from said arm and has its upper end twisted, as indicated at 876, 90° from the normal plane of said bar. A retaining strap 877 is preferably employed to hold the lower part of the bar 875 flatwise against the arm 872. The upper twisted end 876 of the bar 875 projects into a suitable slot 878 formed in the carrier head 838, and said bar has journalled thereon at said end and at opposite sides thereof rollers 879 which are engaged in corresponding recesses 880 also formed in said head. It will thus be apparent that the lever comprising the arm 872 and bar 875 will be rocked by a positive action in opposite directions about the pivot 874 by the box cam 812, and that such rocking movement will occur once during each cycle of operation of the machine. Accordingly, the carrier 838, 839, through engagement of the rollers 879 in the recesses 880 of the head 838, will be positively advanced and retracted along and relative to the bars 842 to film section mounting and film section receiving positions, respectively, and that such advancing and retracting movements will occur once during each cycle of operation of the machine.

In order to insure accurate location of the carrier 838, 839 in its film section receiving and mounting positions, the cam groove 870 of the box cam 812 is designed to move said carrier beyond said positions, and positive stop elements 881 and 882 are employed and arranged at said positions, respectively, so that the carrier will engage and will be positively stopped by said elements at said positions in opposition to the further thrust imposed thereon by the cam, the actuating bar 875 at these instances flexing or yielding under such thrust thus avoiding any damage to the carrier or its operating mechanism. The stop elements 881 and 882 are in the form of threaded rods which are adjustably mounted in the lower section 801 of the frame 694 and in a bracket 883, respectively, said bracket being bolted or otherwise suitably secured to said frame section at the top and front thereof and also serving as a support for the front end portions of the plate 172 and the side guide bar 174. The stop elements 881 and 882 are respectively threaded into the frame section 801 and bracket 883 and are locked in adjusted positions by lock nuts 884 and 885, respectively.

Vacuum is created and broken at predetermined intervals in the carrier 838, 839 to respectively grip and release the severed image-bearing portion of the film strip 575 and for this purpose, the carrier head 838 has connected thereto one end of a flexible conduit 886 which communicates with the passage 841 in said head and has its opposite end connected to one end of a rigid conduit 887. The opposite end of the rigid conduit 887 is connected to and at the bottom of a block 888 which forms part of a valve unit indicated generally at 889 which is bolted or otherwise suitably secured to the lower section 801 of the frame 640 exteriorly thereof. As best shown in FIG. 8, the conduit 887 communicates with the lower end of a passage 890 formed in and extending vertically of the valve block 888 and which, in turn communicates at the upper end thereof with a bore 891 formed in and extending longitudinally through said block. The block 888 is formed in the bore 891 thereof with two axially spaced annular chambers 892 and 893. The chamber 892 communicates with a relief passage 894 (FIG. 4) formed in the block 888 and which opens outwardly to atmosphere through the outer side of said block. The chamber 893 communicates with the lower end of a vertical passage 895 formed in the block 888. Connected with the block 888 and communicating with the passage 895 and with the chamber 893 and bore 891 through said passage is one end of a rigid conduit 896 which extends from said block downwardly through a suitable clearance opening 897 in the plate 22 and has its opposite end connected to the vacuum manifold 505. The perforations in the carrier plate 839 are thus pneumatically connected with the vacuum pump 502 through the chamber 840, passage 841, conduits 886 and 887, passage 890, bore 891, chamber 893, passage 895, conduit 896 and manifold 505, and with the atmosphere from the passage through the bore 891, chamber 892 and passage 894.

Slidably mounted in the bore 891 of the valve block 888 is a piston valve 898 which is formed intermediate its ends with a reduced annular portion 899 which is of a length substantially equal to the distance between the chambers 892 and 893 in said block. The piston valve 898 projects beyond the back end of the block 888 and is rounded at said end for engagement by the free upper end of a vertical arm 900 which is pivotally mounted at the lower end thereof on a stud 901 suitably secured in the lower section 801 of the frame 640. The arm 900 has journalled thereon at the upper end thereof a cam follower 902 which is engaged by a cam 903 that is keyed and suitably secured to the cam shaft 807. The piston valve 898 is yieldingly held in engagement with the arm 900, and the cam follower 902 is, in turn, yieldingly held in engagement with the cam 903, by a coil compression spring 904 which is located between said valve and a cap 905 which is suitably secured to the block 888, said spring being recessed into said valve and said cap and engaging both of the same. The cap 905 is provided in the inner surface thereof with a clearance space for the adjacent end of the piston valve 898, and to prevent said piston valve from becoming "air bound" between the block 888 and the cap 905, the latter is provided with a suitable relief port 906. The piston valve 898 is thus cam operated in one direction by the cam 903 and is spring operated in the opposite direction by the spring 904 to respectively make and break vacuum in the carrier 838, 839 once during each cycle of operation of the machine.

When the cam follower 902 is engaged by the high part of the cam 903 which occurs during the upward movement of the carrier 838, 839 to receive the severed image-bearing portion of the film strip 575, the piston valve 898 is moved to the full-line position thereof shown in FIG. 8, wherein it will be noted that the passage 890 is connected with the passage 895 through the bore 891, the reduced portion 899 of said valve, and the chamber 893, and that the chamber 892 and the relief passage 894 is completely closed to the passages 890 and 895 by the larger diameter portion of the valve adjacent the actuating arm 900. Under these conditions, the vacuum supply conduit 896 will be connected with the conduit 887 and hence, vacuum will be created in the carrier head 838 and in the perforations of the carrier plate 839 to cause the severed image-bearing portion of the film strip 575 to be gripped by said plate.

When, through continued rotation of the cam 903, the cam follower 902 is engaged in the low part of said cam, which occurs just as or just before the severed image-bearing portion of the film strip 575 is applied by the carrier 838, 839 against the adhesive sheet 7 on the card 5b, the piston valve 898 is moved toward the arm 900 by the expanding action of the spring 904 to the broken-line position thereof shown in FIG. 8, wherein it will be noted that the chamber 892 and the relief passage 894 are placed in communication with the passage 890 through the bore 891 and the reduced portion 899 of said valve, and that the vacuum supply passage 895 in the block 888 is completely closed to the passage 890 by the larger diameter portion of the valve adjacent said spring. Under these conditions, vacuum in the bore 891 in the valve block 888 will be broken, and the conduit 887 connected with the carrier 838, 839 will be connected to the atmosphere, thus venting the carrier and causing the same to release the severed image-bearing portion of the film strip 575.

Detector means is provided for detecting, during the normal operation of the machine, the presence of a severed image-bearing portion of the film strip 575 on the carrier 838, 839 during each advancing movement thereof, and for causing the stopping of the machine in the event an image-bearing portion of the film strip is, for some reason, not present on and gripped by said carrier during such movement thereof. As best seen in FIG. 9, said detector means comprises a horizontal plunger 907 which is carried by the carrier head 838 for movement therewith and is fitted for reciprocating movement relative to said head in a bore 908 which is formed in and extends transversely of the head at right angles to the passage 841 and communicates with said passage and the vacuum conduit 886. The bore 908 opens outwardly only through the side of the carrier head 838 facing the front of the machine, and extends inwardly beyond the passage 841 in said head. The plunger 907 is formed at the outer end thereof with a reduced stem-like annular portion 909, and said plunger is of a length such that in the normal projected position thereof shown in FIG. 9, it does not block the communication between the passage 841 and the conduit 886. The plunger 907 is bored at the inner end thereof to receive therein a coil compression spring 910 one end of which engages against said plunger and the opposite end engages against the wall of the bore 908. The spring 910 normally tends to move the plunger 907 relative to the carrier head 838 to the position thereof shown in FIG. 9, wherein it will be noted that the stem-like portion 909 of said plunger projects beyond said head, such movement of the plunger to said position being limited by a snap ring 911 which is engaged in a suitable internal groove formed in the head around the bore 908.

It will be apparent that with the carrier 838, 839 connected with the pump 502, when a severed image-bearing portion of the film strip 575 is received by said carrier and the perforations in the carrier plate 839 are sealed by said image-bearing portion, vacuum will also be created in the bore 908 in the carrier head 838, whereupon atmospheric air pressure acting on the exposed projecting end of the plunger 907 will push said plunger into said head to a retracted position. When the carrier 838, 839 is devoid of a severed image-bearing portion of the film strip 575, or when said carrier fails, for some reason, to receive a severed image-bearing portion, or when a severed image-bearing portion received by said carrier fails to adhere and seal the perforations in the carrier plate 839, no vacuum will be created in the carrier head or the vacuum pressure therein will be insufficient to overcome the resistance of the spring 910 and, hence, the plunger 907 will remain in its projected position shown in FIG. 9.

In the projected position of the plunger 907 shown in FIG. 9, the stem 909 of said plunger, during advancing movement of the carrier head 838, 839, is adapted to engage an angular or inclined lip 912 which is formed on and at the free end of an arm 913 and projects beyond the inner side of said arm. This arm 913 is pivotally mounted at 914 on a bracket 915 which is bolted or otherwise suitably secured to the lower section 801 of the frame 640 exteriorly thereof. Engagement of the lip 912 of the arm 913 by the stem 909 of the projected plunger 907 on the advancing stroke of the carrier 838, 839 will thus rock said arm downwardly about its pivot 914. Accordingly, failure of the carrier 838, 839 to receive and/or grip a severed image-bearing portion of the film strip 575 will result in actuation of the arm 913 by the projected plunger 907. When a severed image-bearing portion of the film strip 575 is received and gripped by the carrier 838, 839 resulting in retraction of the plunger 907, said plunger will occupy a position such that the stem 909 thereof will miss and not engage the lip 912 of the arm 913 on the advancing stroke of said carrier and, hence, no pivotal downward movement will be imparted to said arm. Retraction of the plunger 907 into the carrier head 838 is limited by a stop pin 916 so as to prevent interruption of the communication between the passage 841 in said head and the vacuum conduit 886 by said plunger, said stop pin being suitably secured in said head and projecting into the bore 908.

Downward pivotal movement of the arm 913 by the projected plunger 907 effects stopping of the machine, and for this purpose, said arm has adjustably threaded therein a screw 917 which is locked in adjusted position by a lock nut 922. In the normal raised position of the arm 913, the screw 917 is adjusted so that it just contacts the plunger 918 of a normally open microswitch 919. This switch 919 is suitably secured to the bracket 915 and has conductors 920 and 921 leading therefrom which are connected in the electrical control circuit for the machine, as illustrated in FIG. 21, and to be hereinafter described. Closing of the contacts of switch 919 closes the control circuit in which said switch is connected and effects stopping of the machine in a manner to be hereinafter described.

It will thus be apparent that when a severed image-bearing portion of the film strip 575 is present in proper position on the carrier 838, 839 during the advancing stroke thereof, the switch 919 will not be actuated or closed and, hence, the machine will continue to operate in the usual normal manner. However, when a severed image-bearing portion of the film strip 575 is not present on the carrier 838, 839 during the advancing stroke thereof, or the plunger 907 is not, for some reason, in retracted position during such movement, the switch 919, through downward pivotal movement of the arm 913 and actuation of the switch plunger 918, will be closed, thereby affecting the control circuit to cause stopping of the machine. Upon stopping of the machine, the cause thereof is determined and corrected, the image-bearing portion of the film strip 575 missing from the card 5b is manually mounted therein, said card is returned to the conveyor and placed in engagement with the stop finger 237, and the machine is again started. The micro-switch 919 is self-opening, and when the arm 913 is released by the plunger 907, the plunger 918 of said switch acts to raise and return said arm to its original position. It is to be noted that when the carrier 838, 839 is returned from its advanced endmost film section mounting position during the normal operation of the machine, the projected plunger stem 909 will pass beneath the lip 912 of the arm 913 in the normal position of the latter.

Cooperating with the carrier 838, 839 is a rectangular anvil member 923 which serves to hold the card 5b against upward displacement from the supporting plate 172 and to provide a backing for the adhesive sheet 7 on said card during the mounting of the severed image-bearing portion of the film strip 575 in said card by said carrier, as above described. The anvil member 923 is located above the card supporting plate 172 and is normally spaced upwardly from said plate. The anvil member 923 has cemented to the lower surface thereof of pad 924 of cushioning material, such as rubber. The anvil member 923 is suitably secured at the upper end thereof to the lower end of a vertical stem 925 which is slidably mounted for vertical up and down movement in a bearing block 926 which is formed integrally with the upper section 802 of the frame 640. Rotation of the anvil member 923 and stem 925 relative to the upper frame section 802 is prevented by a pin 927 which is suitably secured in the bearing block 926 and projects downwardly therefrom through a corresponding slot formed in said anvil member.

Vertical reciprocating movement is imparted to the anvil member 923 once during each cycle of operation of the machine in timed relation with the operation of the carrier 838, 839, and for this purpose, the hub 811 of the box cam 812 has suitably secured thereto a third cam 928 which engages a cam follower 929 which is journalled on and at the free lower end of one arm 930 of a bell-crank lever 931 the other arm of which is indicated at 932. This bell-crank lever 931 is suitably secured to a stub shaft 933 which is journalled at opposite ends thereof in suitable bearings in the lower section 801 of the frame 640. The arm 932 of the bell-crank lever 931 is vertically disposed and has pivotally connected thereto at the upper free end thereof the rear end of a horizontal link 934. The front end of the link 934 is pivotally connected to the lower free end of one arm 935 of a bell-crank lever 936 the other arm of which is indicated at 937. This bell-crank lever 936 is suitably secured to a stub shaft 938 which is journalled at opposite ends thereof in suitable bearings in the upper section 802 of the frame 640. The arm 937 of the bell-crank lever 936 projects horizontally toward the stem 925 of the anvil member 923 and has adjustably threaded in the free end thereof a tappet 939 which engages the upper end of said stem and is locked in adjusted position by a lock nut 940. The anvil member 923 is yieldingly urged upwardly to its normal position shown in FIG. 7, by a coil compression spring 941 which surrounds the stem 925 and has one end thereof engaging against the bearing block 926 and the opposite end engaging against a snap ring 942 which is engaged in a suitable groove formed in said stem. The spring 941 also functions to hold the cam follower 929 in engagement with the cam 928.

It will thus be apparent that when the cam follower 929 is engaged with the high part of the cam 928 through rotation of said cam, the anvil member 923, through the described operating connections therefor with said cam, will be moved downwardly to bring the pad 924 thereon into pressing engagement with the upper surface of the card 5b on the supporting plate 172, the degree of pressure applied by said anvil member on said card being regulated through adjustment of the tappet 939. When the cam follower 929 is thereafter engaged with the low part of the cam 928 through continued rotation of said cam, the anvil member 923 will be raised from the card 5b and returned to its original position by the expanding action of the spring 941 in readiness to act on and hold the next card 5b during the next cycle of operation of the machine.

The operation of the described film strip feeding rollers 674, 692 and 681, 693 is timed such that the film supply strip 575 is advanced thereby to bring the next succeeding image-bearing portion thereof into cutting relation with the raised knives 832 and 833 while the preceding severed image-bearing portion is being transferred and mounted in a card 5b by the carrier 838, 839 as above described. Dummy shuttle means is, therefore, provided for bridging the space between the stationary knives 834 and 835 and thereby supporting and guiding the leading image-bearing portion of the film strip 575 across said space and into overlying relation with the far knife 835 while said space is vacated by the carrier 838, 839. As best shown in FIGS. 6 and 7, said dummy shuttle means comprises a bracket 943 which is located rearwardly and transversely of the knives 832, 833, 834 and 835 and is mounted for sliding movement toward and away from said knives on two spaced parallel rods 944 and 945. The rods 944 and 945 extend longitudinally of the frame 640 and are suitably secured at their forward ends in the side plates 827 and 828, respectively, and they are supported intermediate the ends thereof by the rearward extensions of said side plates. Slidably mounted in a suitable vertically extending recess formed in the front face of the bracket 943 is a bracket 946 which is formed adjacent the lower end thereof with a forwardly projecting slightly inclined shelf 947 which is provided at the front edge and centrally thereof with an abutment pad 948. Suitably soldered to the upper surface of the shelf 947 is a polished metal plate 949. The shelf 947 and the plate 949 are substantially of the same width as the width of the carrier 838, 839. The bracket 943 has threaded therein an adjusting screw 950 having a grooved head in which is engaged the bracket 946 whereby the latter may be vertically adjusted relative to the bracket 943 to locate the plate 949 at the proper level with respect to the film strip receiving passages 836 and 837 in the side plates 827 and 828, respectively. The bracket 943 has connected thereto at 951 one end of a coil extension spring 952 the opposite end of which is connected to one of the side plates 827 and 828. The spring 952 continuously tends to slide the dummy shuttle toward the carrier 838, 839, and when said carrier is in its retracted endmost film section receiving position, said dummy shuttle, through engagement of the carrier with the abutment pad 948 on the bracket 946, is held by said carrier in its retracted inoperative position and against advancing movement by the spring 952.

It will thus be apparent that when the carrier 838, 839 is advanced from its retracted endmost film section receiving position, the dummy shuttle in response to such movement of said carrier will immediately follow along with the carrier under the influence of the spring 952 until the bracket 943 of said dummy shuttle contacts the side plates 827 and 828. Accordingly, the bracket 946 and plate 949 thereon of the dummy shuttle will be positioned between the stationary knives 834 and 835 and will occupy substantially the same position vacated by the carrier 838, 839 with respect to said knives, thus bridging the space between the knives and providing a guide for subsequently leading the leading image-bearing portion of the film strip 575 from the stationary knife 834 to and over the stationary knife 835. It will also be apparent that when the carrier 838, 839 is thereafter retracted from its advanced endmost film section mounting position to its endmost film section receiving position between the knives 834 and 835, the bracket 946 and the plate 949 thereon of the dummy shuttle will be withdrawn from between the stationary knives 834, 835 by the carrier through such movement thereof and engagement of the same with the pad 948 on said bracket. When the dummy shuttle is retracted by the carrier 838, 839 to its inoperative position, the spring 942 is thereby again placed under sufficient tension to effect subsequent advancing movement of said dummy shuttle during the next cycle of operation of the machine.

ELECTRICAL CONTROL SYSTEM

FIG. 21

The electrical control circuit shown in FIG. 21 shows the circuit for the card preparing machine described and illustrated in our said parent case and of which the film feeding and mounting apparatus is shown as a part. It is to be understood, however, that this invention could well be embodied with other mechanisms as well. Only that portion of the electrical control circuit shown in FIG. 21 which bears directly upon the present invention will be discussed.

A main source of 110-volt alternating current is connected to the vertical power lines P1 and P2 through closing of a master starting switch S. These power lines P1 and P2 supply alternating current to the various and sundry instrumentalities hereinbefore described, including the controlling relays therefor. The controlling relays are designated by the symbol CR with an appropriate numerical suffix for each relay. The contacts controlled by each relay have the same reference character applied thereto with an appropriate capital letter suffix for each contact. Certain of the relays are of the non-latching type and others are of the latching-in type. As to the latching-in relays, the capital letter suffix LR is used to identify the latch releasing coils of said relays. The contacts of the various relays are shown in the positions assumed before the master switch S is closed.

The main driving motor 25 is directly connected to the power lines P1 and P2 by branch conductors 1075 and 1076, respectively. The vacuum pump motor 503 is directly connected to the power lines P1 and P2 by branch conductors 1077 and 1078, respectively. The motor 646 for driving the film strip feeding and registering mechanism 19 is directly connected to the power lines P1 and P2 by branch conductors 1079 and 1080, respectively. Accordingly, when the master switch S is closed the motors 25, 503 and 646 will start and continue to run as long as the switch remains closed.

Closing of the master switch S also supplies alternating current directly from the power lines P1 and P2 to a conventional electronic photo-electric cell amplifier or control 1081 through branch conductors 1082 and 1083 and 1084, respectively. The photo-electric cell 766 is directly connected with the amplifier 1081 by a conductor 1085. The light source 769 takes its current directly from the power line P2 through a branch conductor 1086 and from the power line P1 through the conductor 1082, a manual normally closed push-button switch 1087 and a conductor 1088. The switch 1087 is mounted on the front panel of a control box (not shown) which is mounted at a convenient point on the machine. The switch 1087 provides for independent extinguishing of the light source 769 when the same is not needed, as when inserts are produced from plain blank material and mounted in the cards.

The conductor 632 connected with one of the terminals of the micro-switch 624 is connected to the power line P1 and the conductor 631 connected to the motor 598 controlled by said switch is connected to the power line P2. Accordingly, when the micro-switch 624 is closed, as hereinbefore described, the motor 598 is started to effect unwinding and feeding of the film strip 575 from the supply roll 578 until the micro-switch 624 is again opened when the free loop 596 of the film strip 575 is fully extended, as hereinbefore described.

The power line P1 has connected thereto conductors 1123 and 1124 which are connected to a manual normally open double-pole double-throw push-button switch 1125, the conductor 1123 being connected to one terminal of one pair of contacts, and the conductor 1124 being connected to the corresponding terminal of the other pair of contacts. The switch 1125 is mounted on the control panel. Upon actuation of switch 1125 in one direction, said switch serves to connect the conductor 1123 with a conductor 1126, and upon actuation of the switch in the other direction, said switch serves to connect the conductor 1124 with a conductor 1127, said conductors 1126 and 1127 being connected to the remaining corresponding terminals of the switch. The conductor 1126 is also connected to a latching-in relay CR8 which is directly connected to the power line P2 by a conductor 1128. The contacts controlled by this relay CR8 are CR8A and CR8B, and the latch releasing coil of said relay is indicated at CR8LR. One terminal of the contacts CR8A is connected by a conductor 1129 to the conductor 1126, and the other terminal of said contacts has connected thereto the conductor 729 which, as previously described, is connected to the solenoid 696 which controls the intermittent feeding of the film strip 575 to the severing means. The other conductor 730 leading from the solenoid 696 is connected directly to the power line P2. The conductor 1060 leading from the timer 698 and associated with the cam actuated timer switch 699 is directly connected to the power line P1. The other companion conductor 1061 leading from the timer 698 is connected to the latch releasing coil CR8LR which is directly connected to the power line P2 by a conductor 1130. One of the terminals of the contacts CR8B of the relay CR8 is connected by a conductor 1131 to a latching-in relay CR9 which is directly connected to the power line P2 by a conductor 1132. The other terminal of the contacts CR8B has connected thereto a conductor 1133 to be hereinafter referred to.

The contacts controlled by the relay CR9 are CR9A, CR9B and CR9C, and the latch releasing coil of said relay is indicated at CR9LR. One of the terminals of the contacts CR9C is connected by a conductor 1134 to the conductor 1060, and the other terminal of said contacts has connected thereto the conductor 787 which, as previously described, is connected to the film strip feeding solenoid 786. The other conductor 788 leading from the solenoid 786 is directly connected to the power line P2. The latch releasing coil CR9LR is directly connected to the power line P2 by a conductor 1135, and said coil has connected thereto a conductor 1136 which is connected to one terminal of a manual normally open push-button switch 1137 which is mounted on the control panel. The other terminal of switch 1137 is directly connected to the power line P1 by a conductor 1138. A conductor 1139 is connected to the conductors 1061 and 1136. One terminal of the contacts CR9B is connected by a conductor 1140 to the photo-cell amplifier 1081, and the other terminal of said contacts is connected by a conductor 1141 to a non-latching relay CR10 which is directly connected to the power line P2 by a conductor 1142. The contacts controlled by this relay CR10 are CR10A and CR10B.

The conductors 727 and 728 which are connected to the terminals of the cam actuated timer switch 697, as previously described, are connected to the power line P1 and to one terminal of one pair of contacts of a double-pole double-throw switch 1157. This switch 1157 is arranged on the control panel to be simultaneously actuated when the push-button switch 1087 is actuated by the operator to closed and opened positions. The corresponding terminal of the other pair of contacts of the switch 1157 has connected thereto the conductor 1127 which, as previously described, is connected with the switch 1125. The conductor 1127 is also connected to the conductor 728. When the push-button switch 1087 is closed, the switch 1157 is adapted to connect the conductors 728 and 1127 with a conductor 1158, and when the push-button switch 1087 is opened, the switch 1157 is adapted to connect the conductors 728 and 1127 with a conductor 1159. The conductor 1158 connected to the switch 1157 is connected to the terminal of the movable contact which is operated by the relay CR10 and cooperates with the fixed contacts of the contacts CR10A and CR10B of said relay. The fixed contact of the contacts CR10A has connected thereto a conductor 1160 which is connected to one terminal of one pair of contacts of a double-pole double-throw switch 1161 which is mounted on the control panel and has connected to the other terminal of said pair of contacts the conductor 1133 which, as previously described, is connected to one of the contacts of the contacts CR8B of the relay CR8. One of the terminals of the other pair of contacts of the switch 1161 has connected thereto a conductor 1162 which is connected to the fixed contact of the contacts CR10B of the relay CR10, said switch having connected to the other terminal of said pair of contacts a conductor 1163 which is connected to the conductor 1133. The conductor 1160 has connected thereto a conductor 1164 which is connected to the terminal of one pair of contacts of a double-pole double-throw switch 1165 having connected to the other terminal of said pair of contacts a conductor 1166 which is connected to a conductor 1167. The switch 1165 is mounted on the control panel for operation in unison with the switch 1161. The conductor 1167 is connected to the conductor 1126 and to one terminal of the other pair of contacts of the switch 1165, the other terminal of said pair of contacts having the conductor 1162 connected thereto.

Let it now be assumed that the switch S has been closed by the machine attendant, thus starting the motors 25, 503 and 646, and energizing the photo-electric cell 766 and the amplifier 1081. The switches 1087 and 1157 are closed by the machine attendant to the positions shown in FIG. 21, thus illuminating the light source 769 and providing for feeding, scanning and registering of the film strip 575. Let it also be assumed that the image-bearing film strip 575, or other like transparent or translucent image-bearing strip, to be handled in the machine is formed so that the image-bearing areas or portions 576 thereof are defined by relatively dark and/or opaque line-spaces or areas 577. The rays of light from the light source 769 will, therefore, normally impinge upon the photo-electric cell 766, thus normally energizing the relay CR10 and thereby closing the contacts CR10A. The switches 1161 and 1165 are then closed by the machine attendant to the positions shown in FIG. 21 so that the circuit including said switches and controlled by the photo-electric cell 766 will function in response to "fall of light," i.e., by said photo-electric cell sensing the dark line-spaces 577 on the film strip 575.

With the film strip 575 threaded into the guide 595, the machine attendant may now, without running the entire machine, operate the film strip feeding and registering mechanism 19 and make whatever adjustments that are necessary to insure accurate registry of the film strip 575 with the severing means. This is conveniently accomplished by means of the switch 1125 which normally occupies a neutral position. Closing of this switch 1125 by the machine attendant in a direction to momentarily connect the conductors 1123 and 1126 will energize the relay CR8, resulting in closing and latching of the contacts CR8A and CR8B and energizing of the film strip feed solenoid 696 and slow speed feeding movement of the film strip 575 along the guide 595. The machine attendant then operates the switch 1125 in the opposite direction to connect the conductors 1124 and 1127 so that the relay CR9 will be energized when a dark line-space 577 on the slow moving film strip 575 reaches and is scanned by the photo-electric cell 766 and thereby interrupts the light beam to said cell or materially decreases the intensity of said light beam upon said cell. Thereupon, the current through the photo-electric cell 766 is decreased, with the result that the relay CR10 is deenergized, thus opening the contacts CR10A and closing the contacts CR10B. Opening of the contacts CR10A breaks the circuit to the relay CR8 and to the film strip feed solenoid 696, and closing of the contacts CR10B completes the circuit to the relay CR9 through the still latched contacts CR8B, thus energizing the relay CR9 to close and latch the contacts CR9C and to open and latch the contacts CR9B. Closing of the contacts CR9C energizes the film strip feed solenoid 786 resulting in continued feeding movement of the film strip 575, but at a faster speed, to the film strip severing means. The machine attendant then releases the switch 1125 to return to the neutral position thereof, thus deenergizing the relay CR9, and then momentarily closes the switch 1137 whereupon the latch releasing coils CR8LR and CR9LR are energized to release the latched contacts CR8A, CR8B, CR9B, and CR9C, thus resetting said contacts and breaking the circuit to the film strip feed solenoid 786. When the switch 1137 is released by the machine attendant, the circuit to the latch releasing coils CR8LR and CR9LR is broken, at which time the above described operations may be repeated by the machine attendant if deemed necessary.

When the image-bearing film or other strip 575 to be handled in the machine is formed so that the image-bearing portions or areas 576 thereof are defined by light and/or transparent or translucent line-spaces or areas 577, the switches 1161 and 1165 are closed by the machine attendant in a direction to connect the conductors 1169 and 1133, and 1162 and 1167, respectively, so that the above-described operations will occur in response to "rise of light," i.e., by the photo-electric cell 766 sensing the light line-spaces 577 on the film strip 575. Under these conditions, the rays of light from the light source 769 falling on the photo-electric cell 766 will normally be interrupted by the film strip 575 and, hence, the relay CR10 will normally be deenergized and the contact CR10B will normally be closed. Accordingly, when a light line-space 577 on the slow moving film strip 575 reaches and is scanned by the photo-electric cell 766, maximum light from the light source 769 will impinge upon said cell and, hence, the current to the cell increases with the result that the relay CR10 will then be energized, thus opening the contacts CR10B and closing the contacts CR10A. Opening of the contacts CR10B breaks the circuit to the relay CR8 and to the film strip solenoid 696, and closing of the contacts CR10A energizes the relay CR9 to effect further feeding movement of the film strip 575 at a faster speed to the film strip severing means. When the relay CR9 is energized resulting in closing and latching of the contacts CR9C and energizing of the film strip feed solenoid 786, and opening and latching of the contacts CR9B and deenergizing of the relay CR10, the switch 1125 is released by the machine attendant to return to the neutral position thereof. Thereupon, the switch 1137 is momentarily closed by the machine attendant to energize the latch releasing coils CR8LR and CR9LR and thereby release the latched contacts CR8A, CR8B, CR9B and CR9C, and break the circuit to the film strip feed solenoid 786.

The make-ready of the entire machine having been completed, the switch 1106 having been closed, the switches 1125 and 1137 having been placed in their normal neutral positions, as shown in FIG. 21, the switches 1087 and 1157 having been closed to the positions shown in FIG. 21, and the switches 1161 and 1165 having been placed in their proper closed positions so that the photo-electric cell 766 should operate by "fall of light" or by "rise of light," as dictated by the type of film or other strip 575 to be handled in the machine, the machine attendant, with the master switch S closed and with the switches 1161 and 1165 positioned and closed, for example, for "fall of light" operation, as shown in FIG. 21, now closes the switch 1095 to provide for starting of the machine and continued normal operation of the various mechanisms.

Closing of the switch 1095 energizes the relays CR1, CR3, CR4 and CR5. Energization of the relay CR1 closes the contacts CR1A and CR1C and opens the contacts CR1B and CR1D. Closing of the contacts CR1A energizes the holding relay CR2. Closing of the contacts CR1C energizes the relays CR6 and CR7. Opening of the contacts CR1B insures that the circuit to the latch releasing coils CR3LR, CR4LR, and CR5LR is initially broken. Opening of the contacts CR1D insures that the circuit to the latch releasing coils CR6LR and CR7LR is initially broken. Energization of the relay CR3 closes and latches the contacts CR3A. Energization of the relay CR4 closes and latches the contacts CR4A. Energization of the relay CR5 closes and latches the contacts CR5A. Energization of the relays CR6 and CR7 closes and latches the contacts CR6A and CR7A, respectively. With a dark line-space 577 on the film strip 575 in non-scanning position with respect to the photo-electric cell 766, the relay CR10 is energized thus closing the contacts CR10A and opening the contacts CR10B.

Energization of the relay CR2 closes the contacts CR2A and CR2B. Closing of the contacts CR2A and CR2B completes the circuit to the relay CR11 through the closed cam actuated timer switches 700 and 701, thus energizing said relay. Energization of the relay CR11 closes the contacts CR11A and CR11B, and opens the contacts CR11C. Closing of the contacts CR11B completes the D.C. circuit to the driving magnet 36, and opening of the contacts CR11C breaks the D.C. circuit to the braking magnet 37. As soon as the driving magnet 36 is energized, and the braking magnet 37 is deenergized, as just described, the machine starts in operation, thereupon the machine attendant releases the switch 1095 thus disconnecting the conductors 1094 and 1096 and thereby deenergizing the relays CR1, CR3, CR4 and CR5, resulting in opening of the contacts CR1A and CR1C only, and closing of the contacts CR1B and CR1D only, the contacts CR3A, CR4A and CR5A remaining closed since they are latched as previously described. However, the holding relay CR2 continues to receive current from the power line P1 through the conductor 1147, the closed and latched contacts CR11A, the conductors 1148 and 1145, the closed contacts CR2A, the conductors 1146 and 1145, the closed push-button switch 1106, and the conductors 1107 and 1102 to the power line P2. Accordingly, the machine will continue to run to process the cards 5 and produce finished cards 5c, as hereinbefore described, so long as the push-button switch 1106 is not opened by the machine attendant and no abnormal operating condition arises in connection with the cards, the film strip 575, and the severed film sections.

It will be apparent that when the push-button switch 1106 is opened, the machine will not immediately stop, but that the stopping of the machine will be delayed until either the cam actuated timer switch 700 is opened or the cam actuated timer switch 701 is opened, whereupon the relay CR11 will be deenergized, the contacts CR11B will again be opened and the contacts CR11C will again be closed, with the result that the driving magnet 36 will be deenergized, and the braking magnet 37 will be energized, thus substantially abruptly stopping the machine.

During the normal operation of the machine, the various operations of the film strip feeding and registering mechanism 19, as previously explained in connection with the make-ready of said mechanism, are automatically controlled at proper intervals by the cam actuated timer switches 697 and 699. Additionally, the closed and latched contacts CR3A, CR4A, CR5A, CR6A and CR7A are connected in series with the relay CR11, and when the relay CR9 is energized in response to the operation of the photo-electric cell 766, the contacts CR9A will also be closed and latched in the series circuit to maintain the circuit to the relay CR11 closed while the cam actuated timer switches 700 and 701 are open, provided no abnormal condition arises which will cause opening of any one of said contacts in which event the machine will be stopped when the timer switch 700 is opened with any one of the contacts CR3A, CR5A, CR6A, CR7A and CR9A open, and when the timer switch 701 is opened with the contacts CR4A open.

For example, when plural cards 5 are simultaneously fed into the machine, resulting in closing of the mercury switch 262, the latch releasing coil CR3LR is thereby energized, thus releasing the contacts CR3A to open and thereby cause stopping of the machine when the cam actuated timer switch 700 is subsequently opened and relay CR11 is thus deenergized. When the film strip cutting and film frame transferring mechanism 20 fails to transfer a severed film frame to card mounting position, resulting in closing of the micro-switch 919, the latch releasing coil CR5LR is thereby energized, thus releasing the contacts CR5A to open and thereby cause stopping of the machine when the cam actuated timer switch 700 is subsequently opened and the relay CR11 is thus deenergized. Likewise, when the push-button switch 1106 is opened by the machine attendant, the holding relay CR2 will be deenergized, with the result that the contacts CR2A and CR2B will open thus causing stopping of the machine when whichever one of the cam actuated timer switches 700 and 701 is opened first and the relay CR11 is thus deenergized. Additionally, in the event the photo-electric cell 766 fails to function, for some reason, with the result that the relay CR9 is not energized and, hence, the contacts CR9A are not closed, the machine will be stopped when the cam actuated timer switch 700 is subsequently opened and the relay CR11 is thus deenergized.

When it is desired to mount plain blank inserts in the cards instead of image-bearing inserts, the switch 1087 is opened by the machine attendant and the switch 1157 is actuated to disconnect the conductors 728 and 1158 and to connect the conductor 728 with the conductor 1159. Accordingly, the light source 769 is extinguished since it is not needed, and the circuit controlling the slow speed film strip feed solenoid 696 and controlled by the photo-electric cell 766 is rendered inoperative. It will thus be apparent that each time the cam actuated timer switch 697 is closed, during the normal operation of the machine, the relay CR9 will thus be energized and, hence, the contacts CR9C will be closed to energize the faster speed film strip feed solenoid 786 and thereby effect feeding movement of the plain blank insert supply strip a proper distance into cutting relation with the strip severing means. It might be said that the diameter of the film strip feed roller 681 is so chosen that the film strip 575 is advanced thereby a distance slightly in excess of the spacing between the fixed knife blades 834 and 835.

While only one embodiment of the present invention has been described in the foregoing specification and illustrated in the accompanying drawings in connection with one specific purpose, it will be apparent that various omissions and substitutions and changes in the form and details of the machine illustrated and its operation may be made by those skilled in the art without departing from the spirit and scope of the invention. The present invention may be embodied in a machine including all of the various mechanisms herein described and illustrated, or certain of said mechanisms may be employed independently for various purposes, or any one or more of the mechanisms may be associated and employed for various purposes independently of the other mechanism or mechanisms. It is not intended, therefore, that the present invention shall be limited to the embodiment shown nor otherwise than by the terms of the appended claims.

What is claimed is:

1. In an apparatus for operating on cards each having an aperture therein and an adhesive sheet secured over said aperture at one face of each card, the combination of a continuously driven conveyor means for advancing successive cards in spaced relation along a predetermined path, stop means arranged along said path, means for operating said stop means for each cycle of operation of the apparatus for arresting the movement of each card for a predetermined interval and thereafter releasing said card for further movement by said conveyor means, a strip severing means, means for operating said severing means once for each said cycle of operation, an endless strip of material having a plurality of register marks spaced therealong, a first means to feed said strip in a predetermined path toward said severing means at a first speed in timed relation to the operation of said severing means, a scanning means positioned in said strip path a predetermined distance from said severing means, a second means to feed a predetermined length of said strip into register with said severing means at a second speed, means responsive to the passage of a register mark under said scanning means to render said first means inoperative and to actuate said second feed means, and carrier means operable in timed relation to said severing means and said card stop means to receive each severed strip portion and to mount the same over the aperture of a card held by said card stop means.

2. An apparatus for operating on cards each having an aperture therein comprising means to feed a card from a supply thereof to an insert station for a predetermined interval and to thereafter move it away from said station, means to operate said card feed means once during each cycle of operation of the apparatus, a strip severing means, means for operating said severing means once during each said cycle, an endless strip of material having a plurality of register marks spaced therealong, a first means to feed said strip in a predetermined path toward said severing means at a first speed in timed relation to the operation of said severing means, a scanning means positioned along said strip path a predetermined distance from said severing means, a second means to feed a predetermined length of said strip into register with said severing means at a second speed, means responsive to the passage of a register mark under said scanning means to render said first feed means inoperative and to actuate said second feed means, and carrier means operable in timed relation to said severing means and said card feed means for receiving the severed strip portion and transferring the same into the aperture in the card.

3. In an apparatus as defined in claim 2 comprising means for feeding said strip of material from a source of supply thereof and into a free loop beyond said feeding means, said first means feeding said strip from said free loop toward said severing means, and brake means arranged between said free loop and said first feed means and acting continuously on said strip for holding the same against retracting movement relative to said first and second feed means while permitting feeding movement of said strip by said first and second feed means.

4. In apparatus for mounting insert sheets in apertures in cards each having an adhesive sheet secured thereto and extending at least partially over the aperture therein, a planar support for the card having an opening extending therethrough and being of a size at least to expose the aperture in the card, severing means spaced from the card along the plane thereof for cutting an insert sheet from a supply strip of relatively thin flexible material having a plurality of light responsive indicia spaced therealong, said severing means comprising a pair of cooperating cutting surfaces disposed in spaced parallel relation and extending across the width of the strip, timed means for operating said cutting surfaces, means operable in timed relation to said cutting surfaces for feeding the supply strip into operative position between said cutting surfaces, means responsive to said indicia on said strip for actuating said feeding means, carrier means arranged for operation between said cutting surfaces for receiving the severed insert sheet and transferring the same horizontally to the card and upwardy through said support opening into the aperture in the card and pressing said insert sheet against the adhesive sheet on the card, a movably mounted guide for bridging the space between the cutting surfaces and thereby guiding the leading end portion of said strip across said space as it is advanced by said feeding means, said guide occupying a retracted inoperative position exterior of said space when said carrier means in its retracted sheet receiving position occupies said space, and means for moving said guide from its retracted inoperative position to its operative position between said cutting surfaces when said carrier means is advanced toward said card.

5. Apparatus as defined in claim 4 wherein said means for actuating said guide comprises a spring operably connected to said guide and tending at times to move the same to its operative position, and said guide is moved to its retracted inoperative position by and through return movement of said carrier means to its insert sheet receiving position.

6. Apparatus as defined in claim 4, wherein said carrier means comprises a vacuum body having a rectangular vacuum insert sheet receiving and gripping surface at the top thereof of substantially the same length and width as that of the insert sheet, means mounting said vacuum body for rectilinear vertical and horizontal reciprocating movements, timed means for horizontally reciprocating said vacuum body between the insert sheet receiving and mounting positions thereof, timed means for vertically reciprocating said vacuum body at the end limits of horizontal movement thereof, means for producing vacuum in said vacuum body, and timed valve means for controlling the making and breaking of vacuum in said vacuum body to respectively grip and release the insert sheet.

7. Apparatus as defined in claim 6, comprising operable control means located between the end limits of horizontal reciprocating movement of said vacuum body, means responsive to the operation of said control means for effecting a stopping of the apparatus, and a controlling member mounted on and reciprocal with said vacuum body and operable to engage and actuate said control means by the forward travel of said vacuum body when during such travel no insert sheet is present on and gripped by said vacuum body.

8. Apparatus as defined in claim 6, comprising operable control means located between the end limits of horizontal reciprocating movement of said vacuum body, means responsive to the operation of said control means for effecting a stopping of the apparatus, an operable controlling member mounted on and reciprocal with said vacuum body for engaging and actuating said control means by the forward travel of said vacuum body, and operable means under the control of the vacuum pressure created in said vacuum body for positioning said controlling member according to the degree of said vacuum pressure, whereby engagement and actuation of said control means by said controlling member is avoided when an insert sheet is present on and gripped by said vacuum body resulting in full vacuum pressure in said vacuum body, and such engagement and actuation occurs when no insert sheet is present on and gripped by said vacuum body resulting in no vacuum pressure or substantially no vacuum pressure in said vacuum body.

9. Apparatus as defined in claim 4, wherein said carrier means comprises a vacuum body having a sheet receiving and gripping surface, means for producing the vacuum in said vacuum body, timed valve means for controlling the making and breaking of vacuum in said vacuum body to respectively grip and release the insert sheet, a pivotally mounted control arm located between the end limits of horizontal reciprocating movement of said body, an electric switch arranged to be actuated by said arm to affect an electrical circuit and thereby cause stopping of the apparatus, a controlling member mounted on and reciprocal with said vacuum body and normally projecting therefrom so as to engage and actuate said arm by the forward travel of said vacuum body, a plunger slidably mounted in said vacuum body and connected with said controlling member, and a spring engaged with said plunger and acting to bias the same in a direction to yieldingly hold said controlling member in its projected position, said plunger being actuated in the opposite direction by the vacuum pressure created in said vacuum body when an insert sheet is present on and gripped by said vacuum body, whereby said controlling member is attracted toward said body by said plunger so that engagement and actuation of said arm by said controlling member is avoided.

10. An apparatus for operating on cards each having an aperture therein comprising means to feed a card from a supply thereof to an insert station for a predetermined interval and to thereafter move it away from said station, means to operate said card feed means once during each cycle of operation of the apparatus, a strip severing means, means for operating said severing means once during each said cycle, a supply roll of strip material having a plurality of register marks spaced therealong, a support for said supply roll, means for unwinding the strip into a free loop of a predetermined length, first means for feeding said strip from said free loop along a predetermined path toward said severing means at a first speed in timed relation to the operation of said severing means, a scanning means positioned along said strip path and at a predetermined distance from said severing means, a second means to feed a predetermined length of said strip into register with said severing means at a second speed, means responsive to a passage of a register mark under said scanning means to render said first feed means inoperative and to actuate said second feed means, means controlled by said free loop for actuating said means for unwinding the strip when said free loop is reduced from its predetermined length through the feeding actions of said first and second feed means and to deactuate said strip unwinding means when said free loop is restored to said predetermined length, and carrier means operable in timed relation to said severing means and said card feed means for receiving the severed strip portion and transferring the same into the aperture in the card.

11. Apparatus as defined in claim 10, wherein said means controlled by said free loop comprises a lever mounted for free pivotal movement about a horizontal axis and having an element disposed within and engaged with said free loop, said element and said lever being raised by said free loop in response to reduction in the length of said free loop and being lowered by gravity in response to increase of said free loop from its reduced size, a cam connected with said lever for rotation thereby as the same raises and lowers, a switch closing arm actuated by said cam when said lever is raised to a predetermined position, and a switch opening arm actuated by said cam when said lever is lowered to a predetermined position.

12. An apparatus for operating on cards each having an aperture therein comprising means to feed a card from a supply thereof to an insert station for a predetermined interval and to thereafter move it away from said station, means to operate said card feed means once during each cycle of operation of the apparatus, a strip severing means, means for operating said severing means once during each said cycle, an endless strip of material having a plurality of images thereon with spaced areas therebetween, a first means to feed said strip in a predetermined path toward said severing means at a first speed, a second means to feed a predetermined length of said strip into register with said severing means at a second speed, means in said strip path and positioned a predetermined distance from said severing means to detect the passage of a said spaced area for stopping said first feed means and for actuating said second feed means, and carrier means operable in timed relation to said severing means and said card feed means for receiving the severed strip portion and transferring the same into the aperture in the card.

13. In apparatus for mounting film sections in apertures of card-like members, the combination of conveyor means to advance successive apertured cards to a film mounting station for a predetermined interval and to thereafter move each away from said station, means to operate said conveyor means once during each cycle of operation of the apparatus, severing means for cutting a film section from a strip of film having images thereon spaced at intervals therealong and operable for cutting one film section for each said cycle, carrier means operable in timed relation with said severing means for receiving each film section and transferring the same into each card aperture at said station, first means comprising a feed roller and a cooperating pressure roller for feeding said strip along a predetermined path, means for continuously rotating the first means feed roller, second means comprising a feed roller and a cooperating pressure roller, means for rotating the second means feed roller for feeding said strip a predetermined distance along said path, means for normally holding the second means feed roller against rotation, means for actuating said holding means to release the second means feed roller for rotation, pivotally mounted lever means having the first and second means pressure rollers mounted at respective ends thereof, means to hold said lever means biased in one direction so that the first means pressure roller is normally retained in contact with the first means feed roller and the second means pressure roller is normally retained out of contact with said second means feed roller, means for moving said lever so as to position the second means pressure roller in contact with the second means feed roller and to move the first means pressure roller out of contact with the first means feed roller, scanning means located along said strip path and positioned a predetermined distance from said severing means and responsive to record the passage of the strip portions between images, and means responsive to the recording of said scanning means to actuate the holding means for the second means feed roller and to actuate the moving means for said lever.

14. Apparatus as defined in claim 13, comprising means operable in timed relation to said severing means to de-actuate the said lever moving means.

15. Apparatus as defined in claim 13 wherein the feed roller of said first means is rotated at a relatively slow speed, and the feed roller of said second means is rotated at a relatively faster speed.

16. Apparatus as defined in claim 13 wherein said scanning means is located beyond said first strip feeding means, and said second strip feeding means is located between said first means and said scanning means.

17. Apparatus as defined in claim 13 wherein the means for rotating the feed roller of said second means includes a friction slip connection, and said holding means comprises an annular member drivably connected to said second means feed roller and having an abutment thereon, a pivotal stop lever normally engaged with said abutment, and biasing means acting upon said stop lever and yieldingly urging the same toward said annular member, and said means for actuating said holding means includes a latch member normally engaged with said stop lever.

18. Apparatus as defined in claim 17 wherein said latch member is mounted for pivotal movement out of and into engagement with said stop lever, and comprising biasing means acting upon said latch member and yieldingly urging the same toward said stop lever, and means engaged by said latch member for moving the same out of engagement with said stop lever substantially immediately following the release of said annular member by said stop lever.

19. Apparatus as defined in claim 18 wherein said annular member is provided with two abutments disposed diametrically opposite each other, whereby the rotation of said annular member is limited to one-half of a revolution and consequently feeding movement of said strip by said second means is limited to a predetermined extent.

20. In an apparatus for mounting film sections in apertures of card-like members, the combination of a conveyor means to advance successive apertured cards from a supply thereof to a film mounting station, severing means for cutting a film section from a strip of film having a plurality of images thereon with spaced areas therebetween and operable for cutting one film section during each cycle of operation of the apparatus, carrier means for receiving each severed film section and transferring the same into each card aperture at said station, said severing means comprising periodically operated knife means for severing individual image-bearing sections from a supply strip thereof having means thereon of optical characteristics substantially different from said images located between adjacent images and defining the length of said sections, first means for feeding said strip at a relatively slow speed along a predetermined path toward said knife means, normally inoperative second means for feeding said strip at a relatively faster speed a predetermined distance along said path toward said knife means, a photo-electric cell arranged along said path at one side of said strip and beyond said first and second feeding means and located from said knife means a distance less than the length of the image-bearing portions of said strip, a source of light arranged at the other side of said strip opposite said photo-electric cell for directing a beam of light through said strip onto said cell, means controlled by said photo-electric cell for interrupting the feeding action of said first means on said strip and for initiating the feeding action of said second means on said strip when a spaced area on said strip reaches said photo-electric cell, and means for interrupting the feeding action of said second feed means on said strip when the latter is advanced an extent equal to said predetermined distance and an image is disposed in cutting relation to said knife means.

21. An apparatus for operating on cards each having an aperture therein comprising means to feed a card from a supply thereof to an insert station for a predetermined interval and to thereafter move it away from said station, means to operate said card feed means once during each cycle of operation of the apparatus, a strip severing means, means for operating said severing means once during each said cycle, an endless strip of material having a plurality of register marks spaced therealong, first feed means for said strip, means to continuously operate said first feed means, first strip pressure means positioned in contact with said first feed means, means to move said first strip pressure means out of contact with said first feed means, scanning means positioned along the path of said strip and at a predetermined distance from said severing means, second feed means for said strip, means to operate said second feed means for a predetermined length of time, second strip pressure means positioned out of contact with said second feed means, means to move said second strip pressure means into contact with said second feed means for said predetermined length of time, means responsive to the passage of a register mark under said scanning means to simultaneously actuate said means to move said first and second strip pressure means and to actuate said means to operate said second feed means, and carrier means operable in timed relation to said severing means and said card feed means for receiving the severed strip portion and transferring the same into the aperture of the card.

References Cited by the Examiner

UNITED STATES PATENTS

| | | | |
|---|---|---|---|
| 1,916,845 | 7/33 | Leland | 226—35 |
| 2,031,503 | 2/36 | Rainey | 83—365 |
| 2,591,519 | 4/52 | Decker | 156—514 XR |
| 2,643,786 | 6/53 | Baker | 156—514 |
| 2,666,543 | 1/54 | Standish | 156—514 |
| 2,710,702 | 6/55 | Gamble | 156—354 |
| 2,711,861 | 6/55 | Heygel et al. | 242—68 |
| 2,735,677 | 2/56 | Sandrik et al. | 226—35 |
| 2,744,562 | 5/56 | La Rocca et al. | 154—1.6 |
| 2,796,110 | 6/57 | Dahlberg | 154—1.6 |
| 2,877,960 | 3/59 | Schmidt et al. | 242—68 |

EARL M. BERGERT, *Primary Examiner.*

CARL F. KRAFFT, ALEXANDER WYMANN, *Examiners.*